US008263889B2

(12) United States Patent
Takahashi et al.

(10) Patent No.: US 8,263,889 B2
(45) Date of Patent: Sep. 11, 2012

(54) MANIPULATING APPARATUS AND MOBILE TERMINAL INCLUDING THE SAME

(75) Inventors: Nobuyuki Takahashi, Tokyo (JP); Hiroaki Masuda, Utsunomiya (JP)

(73) Assignee: Sony Computer Entertainment Inc., Tokyo (JP)

( * ) Notice: Subject to any disclaimer, the term of this patent is extended or adjusted under 35 U.S.C. 154(b) by 223 days.

(21) Appl. No.: 12/758,202

(22) Filed: Apr. 12, 2010

(65) Prior Publication Data

US 2010/0258425 A1    Oct. 14, 2010

(30) Foreign Application Priority Data

Apr. 13, 2009  (JP) ................................. 2009-097302
Apr. 13, 2009  (JP) ................................. 2009-097303

(51) Int. Cl.
   *H01H 1/10*    (2006.01)
(52) U.S. Cl. ....................................................... 200/512
(58) Field of Classification Search .......... 200/510–514, 200/5 R, 6 R, 343, 339, 5 A, 6 A; 463/36–37; 273/148 B
   See application file for complete search history.

(56) References Cited

U.S. PATENT DOCUMENTS

| 4,687,200 A * | 8/1987 | Shirai .............................. 463/37 |
| 5,853,326 A | 12/1998 | Goto et al. |
| 6,344,620 B1 | 2/2002 | Nakamura |
| 6,567,074 B2 * | 5/2003 | Numata et al. ................. 345/169 |
| 7,377,851 B2 * | 5/2008 | Goto et al. ....................... 463/37 |
| 7,915,547 B2 | 3/2011 | Otani et al. |
| 2009/0050464 A1 | 2/2009 | Otani et al. |

FOREIGN PATENT DOCUMENTS

| CN | 1124855 A | 6/1996 |
| CN | 1310851 A | 8/2001 |
| EP | 2028669 A2 | 2/2009 |

OTHER PUBLICATIONS

Office Action for corresponding Chinese Patent application No. 201010164496.8, dated Jun. 4, 2012.

* cited by examiner

*Primary Examiner* — Edwin A. Leon
(74) *Attorney, Agent, or Firm* — Matthew B. Dernier, Esq.; Gibson & Dernier LLP

(57) ABSTRACT

Disclosed herein is a manipulating apparatus (mobile terminal) including a chassis provided with a manipulating portion (directional manipulating portion) with which an input manipulation is carried out. The manipulating portion includes: a key top exposed to an outside of the chassis through an opening portion, which the chassis has, and a key main body having a base portion on which the key top is formed within the chassis; a circuit board in which a detecting portion (switches) is disposed in a position corresponding to the key top; and a flat plate-shaped elastic body (elastic body) interposed between the key main body and the detecting portion; in which the elastic body is provided integrally with the base portion. According to the manipulating apparatus, not only the soft click feeling can be obtained from the elastic body, but also the manipulating apparatus can be thinned as compared with the case where the existing elastic body (contact rubber) is adopted by adjusting the thickness size each of the elastic body.

19 Claims, 16 Drawing Sheets

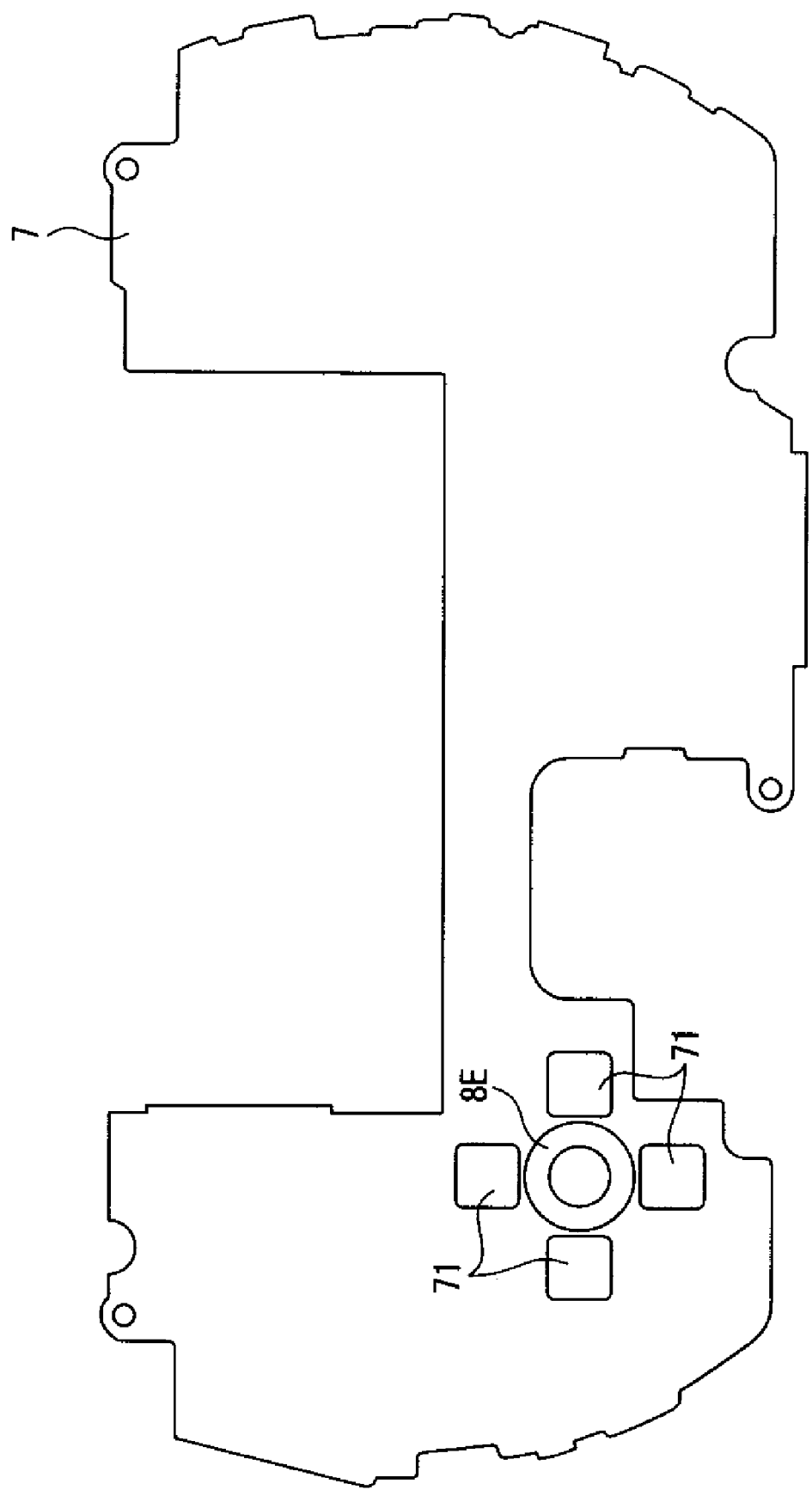

MANIPULATING APPARATUS AND MOBILE TERMINAL INCLUDING THE SAME

The entire disclosure of Japanese Patent Application No. 2009-097302, filed Apr. 13, 2009, and No. 2009-097303, filed Apr. 13, 2009 are expressly incorporated by reference herein.

BACKGROUND OF THE INVENTION

1. Field of the Invention

The present invention relates to a manipulating apparatus including a chassis provided with a manipulating portion with which an input manipulation is carried out, and a mobile terminal including the same.

2. Description of Related Art

Heretofore, there has been known an electronic apparatus including directional keys with which input manipulations can be carried out up, down, right and left, respectively. A mobile terminal such as a game console, and a controller which is connected to a stationary game console, a Personal Computer (PC) or the like can be given as such an electronic apparatus. A controller for a game console including a key top main body which is provided in a housing main body composed of an upper half and a lower half, and with which a pair of contacts disposed on a circuit board within the housing main body is depressed has been known as such a controller. This controller for a game console, for example, is described in U.S. Pat. No. 5,853,326 (hereinafter referred to as Patent Document 1).

In the controller for a game console described in Patent Document 1, the key top main body has such a construction that a plurality of key tops each exposed to the outside of the housing main body are formed integrally with one another. Also, when the desired key top of a plurality of key tops is depressed, a leg portion of an elastic body (contact rubber) interposed between the key top main body and the circuit board and corresponding to the desired key top thus depressed is buckled in such a manner. When the leg portion of the elastic body is buckled, a depressing portion provided inside the leg portion depresses a movable contact portion. Also, when the movable contact portion thus depressed, and a fixed contact portion on the circuit board electrically contact each other, an input manipulation using the desired key top is detected by the circuit board concerned. A click feeling is caused for a user in a phase of the buckling of such an elastic body and thus a user can known as much about the key input. Therefore, by providing such an elastic body, a manipulation property of the controller is enhanced.

However, the controller for a game console described in Patent Document 1 involves such a problem that it is difficult to promote the thinning of the controller itself because a height size of the elastic body (a size in a direction of expansion and contraction of the elastic body) is large.

Giving a detailed description, the elastic body disposed on the circuit board is composed of the approximately cylindrical leg portion and the depressing portion. In this case, the approximately cylindrical leg portion extends so as to protrude from the circuit board. Also, the depressing portion is provided at a tip, of the leg portion, in an extension direction, and serves to depress a movable contact portion. By buckling the leg portion in the manner as described above, the depressing portion depresses the movable contact portion. When such an elastic body is used, a space for the expansion and contraction of the leg portion needs to be provided between the circuit board and the key top portion. As a result, there is encountered such a problem that it is difficult to promote the thinning of the controller.

From such a problem, the construction allowing the thinning of the controller to be promoted has been described up to this day.

In addition, in the controller for a game console described in Patent Document 1, the elastic body urges the key top main body in a direction along which the key top main body is moved away from the circuit board so that a base portion of the key top main body is brought into contact with an end edge of an opening portion of the upper half of the housing main body, and a recess portion of the key top main body is brought into contact with a key top central supporting portion of the upper half of the housing main body. As a result, the key top main body is maintained within a housing main body. However, such a construction involves a problem that a thickness size of the controller becomes larger because the elastic bodies the leg portion of desired one of which is buckled in accordance with the depressing of desired one of the key tops need to be provided so as to correspond to the contacts, respectively.

SUMMARY OF THE INVENTION

The present invention has been made in order to solve the problems described above, and it is therefore desirable to provide a manipulating apparatus in which the thinning can be promoted, and a mobile terminal including the same.

In order to attain the desire described above, according to an embodiment of the present invention, there is provided a manipulating apparatus including a chassis provided with a manipulating portion with which an input manipulation is carried out. The manipulating portion includes: a key top exposed to an outside of the chassis through an opening portion, which the chassis has, and a key main body having a base portion on which the key top is formed within the chassis; a circuit board in which a detecting portion is disposed in a position corresponding to the key top; and a flat plate-shaped elastic body interposed between the key main body and the detecting portion. The elastic body is provided integrally with the base portion.

Here, a directional key (cross key) which has a plurality of key tops disposed adjacent to one another so as to correspond to up, down, right and left sides when the chassis is viewed from a front side, and with which the input manipulation can be carried out either by using individually the key tops or by using the desired key top and one hand-side key top adjacent thereto together with each other can be given as the manipulating portion.

According to the embodiment of the present invention, the flat plate-shaped elastic bodies are provided integrally with the base portion of the key main body. Therefore, by adjusting each of the thickness sizes of the flat plate-shaped elastic bodies, it is possible to reduce a movement amount of key main body when at least any one of a plurality of key tops is depressed. As a result, it is possible to promote the thinning of the manipulating portion, and eventually, the manipulating apparatus. In this case, the elastic body is elastically displaced in accordance with the depressing of the desired key top, whereby the soft click feeling for the desired key top thus depressed can be obtained for the user. In addition thereto, since the key main body is returned back to the state before being depressed due to the elastic displacement of the elastic body, the thinning of the manipulating apparatus can be promoted without impairing the manipulation feeling.

In order to attain the desire described above, according to another embodiment of the present invention, there is provided a manipulating apparatus including a chassis provided with a manipulating portion with which an input manipulation is carried out. The manipulating portion includes: a key top exposed to an outside of the chassis through an opening portion, which the chassis has, and a key main body having a base portion on which the key top is formed within the chassis; and a circuit board having a detecting portion for detecting an input manipulation using the desired key top, the detecting portion being disposed in a position corresponding to the key top. The base portion has a fulcrum point portion in a position surrounded by the key top, the fulcrum point portion protruding in a direction of becoming close to the circuit board and being brought into contact with the circuit board, thereby becoming a fulcrum point for inclination of the key body in a phase of depressing of the desired key top, and an urging member for urging the key main body to a side of the circuit board is provided between the chassis and the key main body.

According to the another embodiment of the present invention, the urging member(s) for urging the key main body to the side of the circuit board to stabilize the key main body is (are) provided between the chassis and the key main body. Therefore, the key main body can be prevented from floating above the circuit board, and thus the key main body can be suitably disposed on the circuit board. In this case, a flat plate-shaped resin or the like having the elasticity can be used as the urging member. Therefore, the manipulating portion can be further thinned as compared with the case of the above construction that the elastic bodies (contact rubbers) are provided in the positions corresponding to the key tops, respectively, or the case where a spring member such as a coil spring is used. Therefore, not only the key main body can be stably located on the circuit board, but also the manipulating apparatus can be thinned.

According to still another embodiment of the present invention, there is provided a mobile terminal including the manipulating apparatus according to the embodiment of the present invention.

In addition, according to yet another embodiment of the present invention, there is provided a mobile terminal including the manipulating apparatus according to the another embodiment of the present invention.

According to each of the still and yet another embodiments of the present invention, it is possible to offer the same effects as those in each of the manipulating apparatuses described above.

In addition, by including such manipulating apparatuses, the mobile terminals can be miniaturized, and eventually, the portability of each of the mobile terminals can be enhanced.

Moreover, by including such manipulating apparatuses, the constructions of the mobile terminals can be simplified, and thus manufacturing processes for the mobile terminals can be simplified.

As set forth hereinabove, according to the present invention, not only it is possible to reduce a stroke amount of key main body, but also it is possible to obtain the click feeling for the desired key top(s) because the elastic body is elastically displaced in accordance with the depressing of the desired key top(s). Accordingly, the manipulating apparatus can be thinned without impairing the manipulating feeling.

In addition, according to the present invention, it is possible to thin the manipulating apparatus, and eventually, the mobile terminal.

BRIEF DESCRIPTION OF THE DRAWINGS

FIG. 16 is a top plan view showing an urging member in the mobile terminal according to the fourth embodiment of the present invention.

DETAILED DESCRIPTION OF PREFERRED EMBODIMENT(S)

1. First Embodiment

Hereinafter, a first embodiment of the present invention will be described in detail with reference to FIG. 1 to FIGS. 6A and 6B.

Entire Construction of Mobile Terminal

Figure 1:
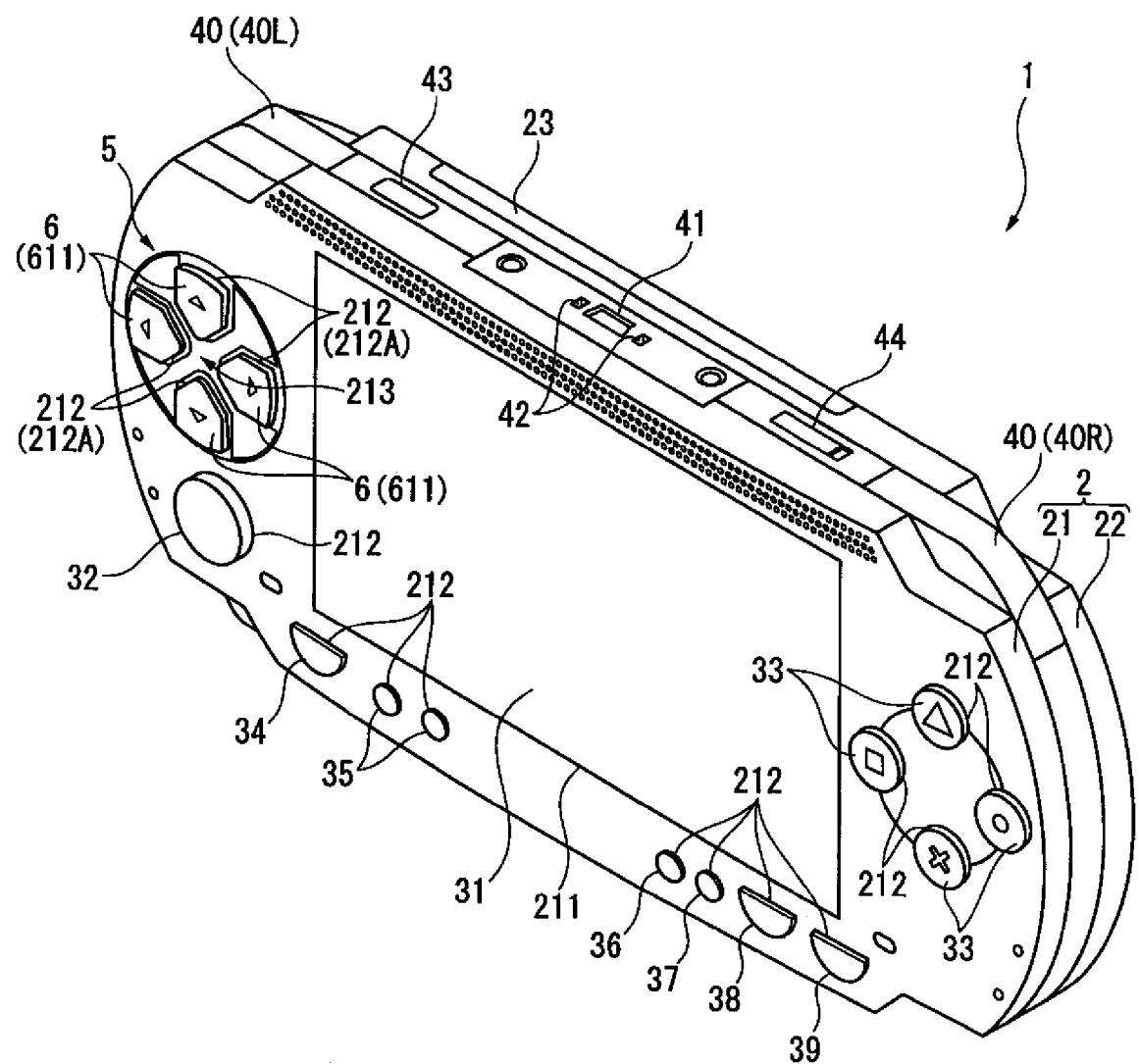
FIG. 1 is a perspective view showing a mobile terminal according to a first embodiment of the present invention.

FIG. 1 is a perspective view of a mobile terminal 1 according to the first embodiment of the present invention when being viewed from a front side.

The mobile terminal 1 reads out a program and data recorded in a disc and a memory, respectively, in accordance with an input manipulation made by a user, thereby carrying out a game, or reproducing an image and a sound. Thus, the mobile terminal 1 corresponds to a mobile terminal including a manipulating apparatus according to an embodiment of the present invention.

The mobile terminal 1, as shown in FIG. 1, includes a chassis 2 and a terminal main body. In this case, the chassis 1 has a flat, landscape and rectangular shape, and both end portions of the chassis 1 are formed into circular arc shapes, respectively. Also, the terminal main body is accommodated in the chassis 2, and includes a liquid crystal panel 31, a cross key 6, a circuit board (refer to FIGS. 2 and 3), and the like each of which will be described later.

Construction of Chassis

The chassis 2 includes a front case 21 and a rear case 22. In this case, the front case 21 is oriented on a front side (a side facing a user) when the user holds the mobile terminal 1. Also, the rear case 22 is screwed into a back surface side of the front case 21.

Of the front case 21 and the rear case 22, a landscape and rectangular liquid crystal panel 31 which is observed through a translucent area 211 of the front case 21 is disposed approximately at a center on the front side of the front case 21. In addition, a plurality of opening portions 212 through which various kinds of keys are exposed to the outside of the chassis 2 are formed on both right-hand and left-hand sides between which the liquid crystal panel 31 is sandwiched, and on a lower side of the liquid crystal panel 31, respectively, in the front case 21. Of the plurality of opening portions 212, four opening portions 212A which are formed so as to correspond to shapes and sizes of four key tops 611 composing a directional manipulating portion 5 which will be described later are formed in positions corresponding to vertices of a virtual approximate square, respectively, on the left-hand side of the front case 21. In addition, although an illustration is omitted in FIG. 1, a main body supporting portion 213 (refer to FIGS. 2 and 3) for supporting a key main body 61 having the four key tops 611 is formed on an inner side in an area surrounded by the four opening portions 212A.

The directional manipulating portion 5 is provided on a left-hand side (on a left-hand side in FIG. 1) of the liquid crystal panel 31. Although details will be described later, the cross key 6 composing the directional manipulating portion 5 has the four key tops 611 in the portions corresponding to the vertices of the virtual approximate square, respectively. Also, the four key tops 611 are exposed to the outside of the chassis 2 through the opening portions 212A, respectively, described above. It is noted that a construction of the directional manipulating portion 5 which will be described later.

In addition, a directional key 32 which is slidable along the front case 21 is disposed on a lower side (a lower side in FIG. 1) of the cross key 6. Also, four decision keys 33 and a power source key (not shown) are provided on a right-hand side (a right-hand side in FIG. 1) of the liquid crystal panel 31.

Keys 34 to 39 with which the terminal main body is caused to carry out predetermined functions, respectively, are disposed on a lower side of the liquid crystal panel 31. In addition, four cover portions of the chassis 2 are inward cut away. Also, decision keys 40 (a left-hand side decision key is taken to be 40L, and a right-hand side decision key is taken to be 40R) are provided in upper left-hand and right-hand side corners, respectively.

A connection terminal 41 in which a mini B terminal conforming to the Universal Serial Bus (USB) standard can be plugged is provided approximately at a center of the upper surface of the chassis 2. Also, power supply terminals 42 electrodes of which are exposed to the outside through respective openings are provided so as to sandwich the connection terminal 41 between them.

In addition, a light receiving window 43 through which an infrared communication is carried out with another external apparatus is provided on the left-hand side of the upper surface of the chassis 2. Also, a lock slider 44 for regulating open of a cover member 23 provided on the back surface side of the rear case 22 is provided on the right-hand side of the upper surface of the chassis 2. When the lock slider 44 is slid, the regulation for the open of the cover member 23 is released, and thus a disc (not shown) can be accumulated in the chassis 2 by opening the cover member 23.

Construction of Directional Manipulating Portion

Figure 2:
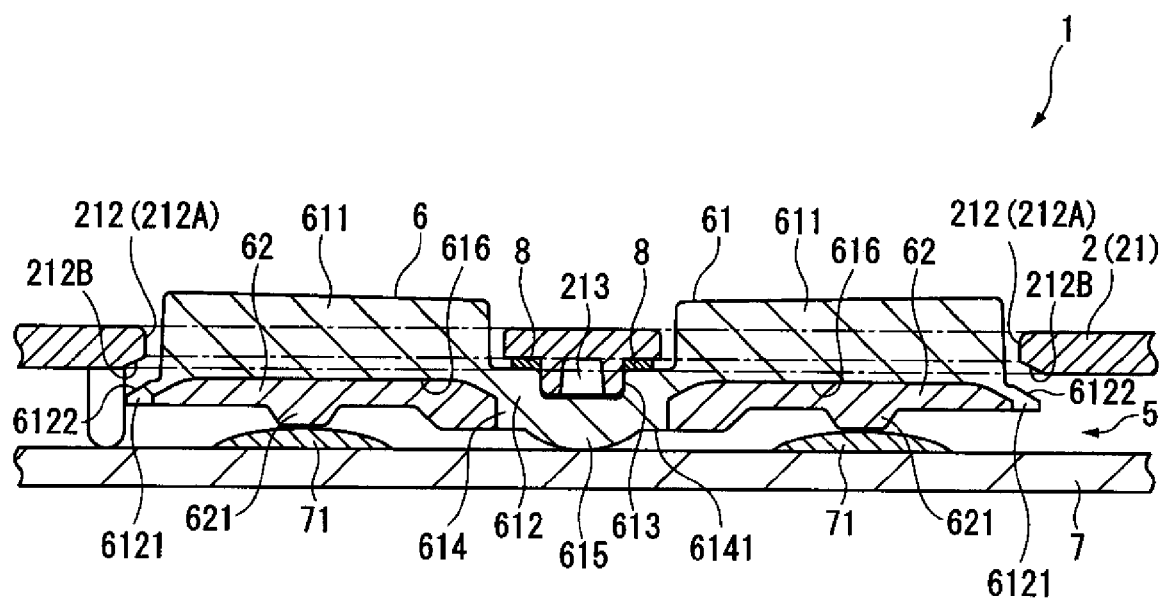
FIG. 2 is a cross sectional view showing a construction of a directional manipulating portion before a key top is depressed in the mobile terminal according to the first embodiment of the present invention.
Figure 3:
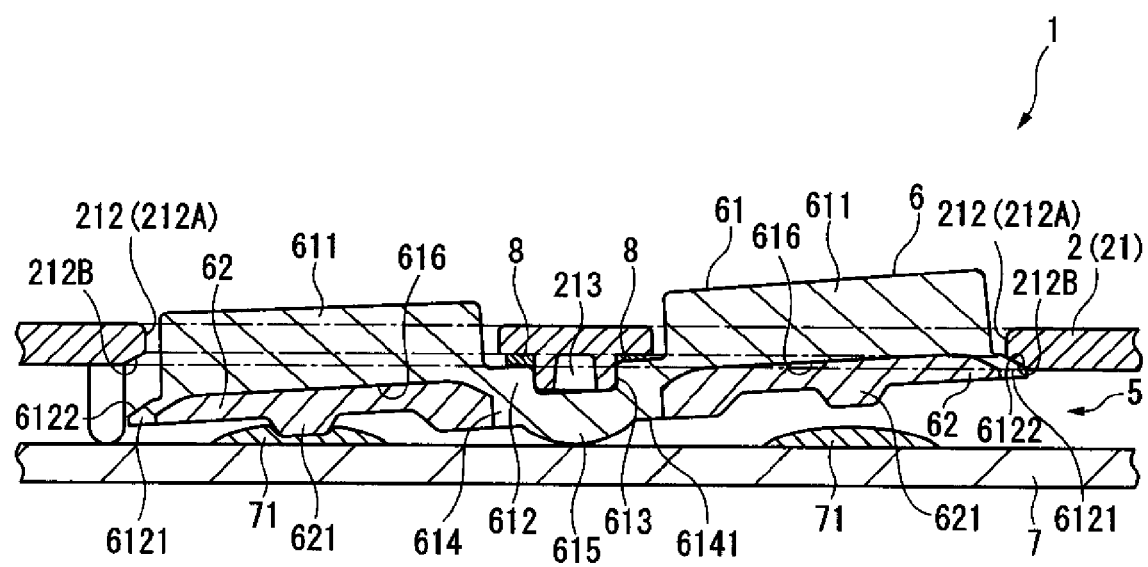
FIG. 3 is a cross sectional view showing the construction of the directional manipulating portion after the key top is depressed in the mobile terminal according to the first embodiment of the present invention.

FIGS. 2 and 3 are respectively cross sectional views each showing a construction of the directional manipulating portion 5. It is noted that in each of FIGS. 2 and 3, an illustration of a switch 71 is omitted which is located in a deep direction with respect to each of the cross sections of FIGS. 2 and 3.

The directional manipulating portion 5 corresponds to a manipulating portion according to an embodiment of the present invention, and as shown in FIGS. 2 and 3, includes the cross key 6 having a plurality of key tops 611, and the circuit board 7 having a plurality of switches 71 disposed so as to correspond to the key tops 611, respectively. Also, when from a form shown in FIG. 2, the desired key top 611 (the left-hand side key top 611 in FIG. 2) is depressed by the user, thereby pressing the switch 71 provided so as to correspond to the position of the desired key top 611, as shown in FIG. 3, the circuit board 7 outputs a control signal representing the effect that the switch 71 is turned ON to a terminal main body.

Construction of Cross Key

Figure 4:
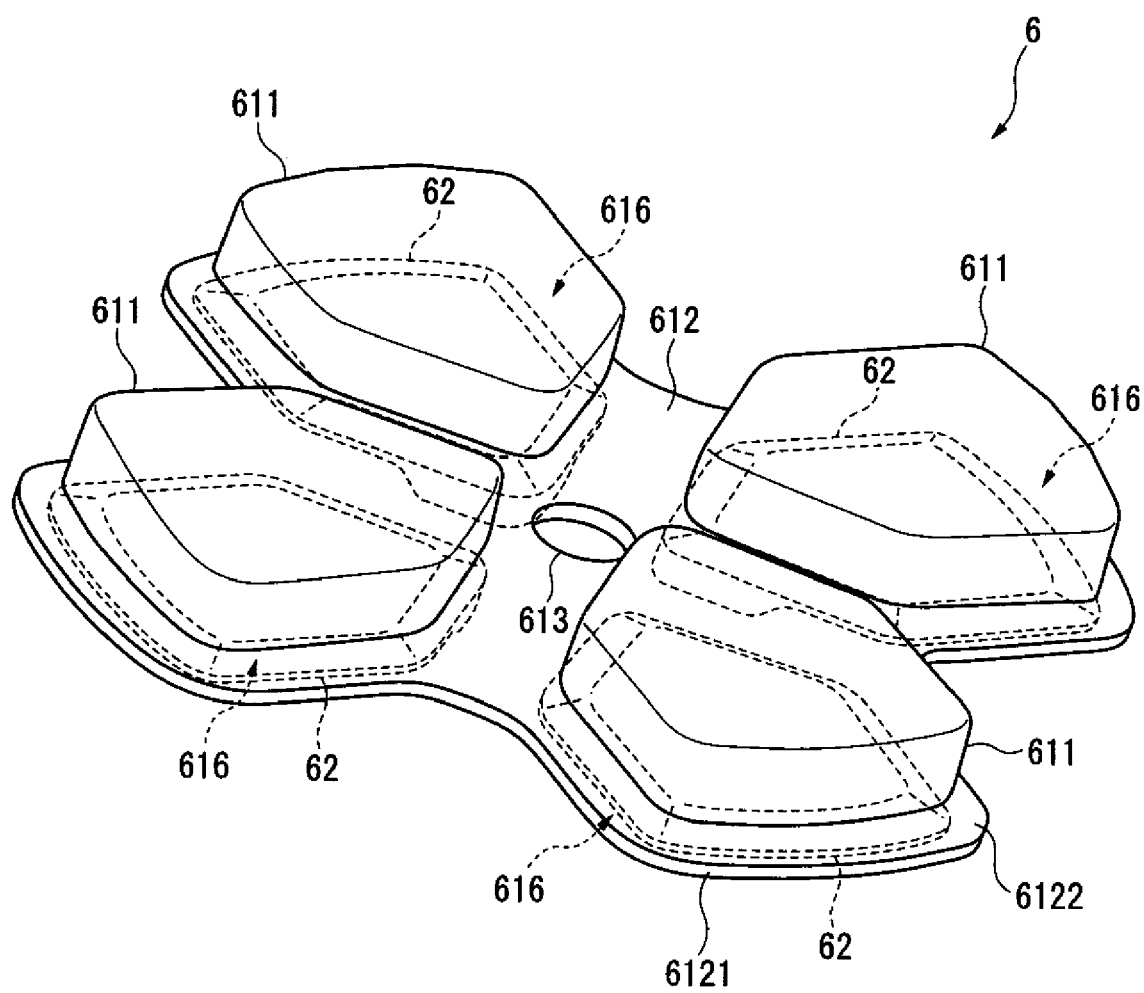
FIG. 4 is a perspective view of a cross key in the mobile terminal according to the first embodiment of the present invention when being viewed from above.
Figure 5:
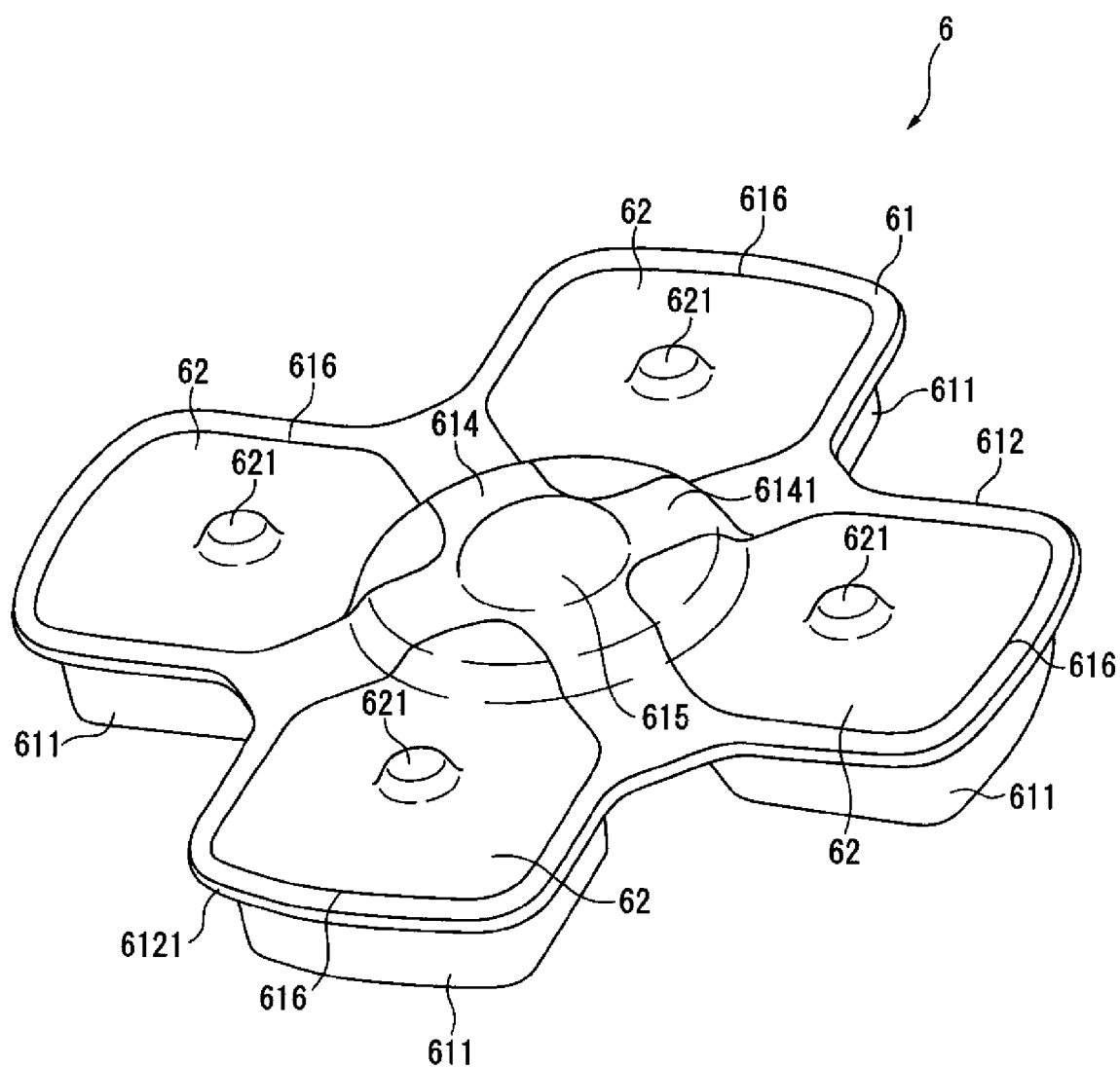
FIG. 5 is a perspective view of a cross key in the mobile terminal according to the first embodiment of the present invention when being viewed from below.

FIG. 4 is a perspective view of the cross key 6 when being viewed from above, and FIG. 5 is a perspective view of the cross key 6 when being viewed from below.

The cross key 6 is a key with which input manipulations can be carried out in eight directions of up, down, right and left, and oblique directions, respectively. The cross key 6 is provided on the circuit board 7 which will be described later, and presses the switch 71 disposed on the circuit board 7 when the desired one of the key tops 611 is depressed by the user.

As shown in FIGS. 4 and 5, the cross key 6 has totally, approximately a cross shape, and has a line-symmetric shape with a straight line passing through the center of the cross key 6 as a center when being planarly viewed. In such a cross key 6, a key main body 61 and elastic bodies 62 are formed integrally with each other through two-color molding. In this case, the key main body 61 has the four key tops 611 corresponding to up, down, right and left directions, respectively, and a base portion 612 in which the four key tops 611 are connected to one another to be integrated with one another. Also, the elastic bodies 62 are provided on the bottom surface side of the key main body 61 so as to correspond to the four key tops 611, respectively.

The key main body 61 is made of a transparent resin (such as an acrylic resin), and the base portion 612 has approximately a cross shape when being planarly viewed.

As shown in FIG. 4, the four key tops 611 are formed on a front surface side (a side facing the front case 21) of four end portions in the base portion 612 so as to protrude outward. Each of the four key tops 611 has a polygonal shape (specifically, a pentagonal shape) when being planarly viewed.

Giving a detailed description, each of the four key tops 611 has a shape obtained by combining an approximately quadrangular shape and an approximately triangular shape with each other. That is to say, each of the four key tops 611 has an external shape having an end edge which is formed by approximately parallel two sides each forming an approximately quadrangular end edge, approximately triangular two sides provided so as to connect one end portions of the approximately parallel two sides, and an approximately circular arc one side connecting the other end portions of the approximately parallel two sides. For this reason, an approximately cross groove when being planarly viewed is formed between each adjacent two key tops 611 and at a center of the key main body 61. Also, an approximately circular recess portion 613 is formed approximately at a center of the approximately cross groove.

A flange portion 6121 which extends toward the outside of each of the key tops 611, and which is located outside each of four opening portions 212A is formed in a periphery of the base portion 612. The running-out of the cross keys 6 into the outside of the chassis 2 is regulated by the flange portion 6121. A surface, in such a flange portion 6121, facing the front case 21 is formed as an inclined surface 6122 in which a thickness size becomes smaller toward the periphery of the base portion 612. Likewise, an inclined portion 212B (refer to FIGS. 2 and 3) which is inclined along the inclined surface 6122 is formed in a portion, of the end edge of the opening portion 212A, facing the inclined surface 6122. For this reason, as shown in FIG. 3, when any one of the four key tops 611 of the cross key 6 is depressed, the inclined surface 6122 and the inclined portion 212B are brought into contact with each other. As a result, the manipulability for the cross key 6 is enhanced because the inclination of the cross key 6 is prevented from being impeded, and thus the inclination of the cross key 6 is smoothly carried out.

It is noted that the flange portion 6121 may not be formed in the entire periphery of the base portion 612. Thus, all it takes is that the flange portion 6121 is formed in the periphery of each of the four key tops 611, and in an area which is most separate from the center of the base portion 612.

As shown in FIG. 5, a thick portion 614 and a fulcrum point portion 615 are formed approximately at the center on the bottom surface side (the side facing the circuit board 7 which will be described later) of the base portion 612. In this case, the thick portion 614 protrudes so as to have approximately a circular shape when being viewed from the bottom surface side. Also, the fulcrum point portion 615 bulges from the approximately central position of the thick portion 614 so as to have approximately a hemispherical shape.

Of the thick portion 614 and the fulcrum point portion 615, the fulcrum point portion 615 is a portion which comes into contact with the circuit board 7 which will be described later, and becomes the fulcrum point when the desired key top 611 is depressed, thereby inclining the cross key 6. By providing the fulcrum point portion 615, the inclination of the cross key 6 is smoothly carried out.

Here, when the adjacent two key tops 611 are depressed at the same time, the cross key 6 is inclined so that the depressed position of the cross key 6 comes close to the circuit board 7. However, when the opposite two key tops 611 (the key tops 611 located on the up and down sides or on the right and left sides, respectively) are pressed at the same time, no cross key 6 is inclined. As a result, the input manipulations are prevented from being carried out at the same time by using the key tops oriented in the directions opposite to each other, and thus the manipulability can be enhanced.

The thick portion 614 is a portion for reinforcing the circumference of the fulcrum point portion 615 against a load applied to the fulcrum point portion 615 in the phase of the depressing of the desired key top(s). Such a thick portion 614 is formed in the circumference of the fulcrum point portion 615, whereby the entire base portion 612 needs not to be thickly formed for the reinforcement. As a result, it is possible to promote the thinning of the base portion 612, and eventually, the thinning of the cross key 6.

In addition, recess portions 616 corresponding to the shapes of the key tops 611, respectively, are formed in the positions corresponding to the four key tops 611, respectively, on the bottom surface side of the base portion 612. The elastic portions 62 are provided within the recess portions 616, respectively.

Each of the elastic portions 62 corresponds to an elastic body according to an embodiment of the present invention, and is obtained by forming an elastic material (such as an elastomer or a silicon rubber) into an approximately flat plate-like shape. Symbols, indicating the up, down, right and left directions, respectively, as shown in FIG. 1, are expressed on the front sides of the elastic portions 62 by a laser beam radiated through the key main body 61 (specifically, the four key tops 611), thereby causing the user to recognize the kinds of keys. As a result, the manipulability is enhanced. In addition, since the symbols are expressed by the radiation of the laser beam, the simplification of the manufacture processes, and enhancement of the design property can be promoted as compared with the case where a sticker or the like having a picture drawn thereon is stuck to the key top.

As shown in FIGS. 4 and 5, such elastic portions 62 are formed in the positions corresponding to the respective key tops 611, that is, within the respective recess portions 616 with the shapes and sizes corresponding to the respective key tops 611. For this reason, the range in which the picture or the like can be formed by the radiation of the laser beam can be made large. In addition, a part of each of the elastic portions 62 occupies a part of the thick portion 614 described above, which results in that the inner side of the front case 21 can be prevented from being observed through the key main body 61 made of the transparent resin. As a result, the external appearance of the mobile terminal 1 can be prevented from being impaired.

A bottom surface of each of the elastic portions 62 (a surface facing the circuit board 7) is formed so as to be flush with the bottom surface of the flange portion 6121 described above. In addition, a bottom surface 6141 of the thick portion 614, and the bottom surface of the area of each of the elastic portions 62 occupying the part of the thick portion 614 are flush with each other.

As shown in FIG. 5, approximately cylindrical protrusion portions 621 protruding outward from the bottom surfaces of the elastic portions 62, respectively, are formed approximately at the centers, on the bottom surface side, of those elastic portions 62, respectively. When the desired key top 611 of the four key tops 611 is depressed and thus the cross key 6 is inclined with the fulcrum point portion 615 as a fulcrum point, corresponding one of the protrusion portions 621 presses the corresponding one of the switches 71 located under the desired key top 611 thus depressed.

Those protrusion portions 621 are formed in the elastic portions 62, respectively, which results in that one of the protrusion portions 621 corresponding to the desired key top thus depressed can press the corresponding one of the switches 71 at a point. As a result, the depressing of the desired key top 611 can be reliably detected by the switch 71 corresponding to the desired key top 611 thus depressed as compared with the case where the entire elastic portion 62 having a large cross-section area presses the switch 71 corresponding to the desired key top 611. In addition, by adjusting a protrusion size of each of the protrusion portions 621, a stroke amount of cross key 6 can be adjusted while the cross key 6 is thinned. Therefore, it is possible to enhance the manipulation feeling for the directional manipulating portion 5, and eventually, the mobile terminal 1, and the reliability of the detection for the input manipulation.

Note that, as shown in FIGS. 2 and 3, a plan position (a height position from the circuit board 7) of each of the tip portions of the protrusion portions 621, that is, a plan position of each of the tip portions of the protrusion portions 621 adapted to be brought into contact with the respective switches 71 is set as being higher than the fulcrum point portion 615 adapted to be brought into contact with the circuit board 7. Also, the plan position of each of the tip portions of the protrusion portions 621 adapted to be brought into contact with the respective switches 71 is set as being higher than a plan position of the portion (the bottom surface 6141), of the thick portion 614, facing the circuit board 7. In other words, each of the tip portions of the protrusion portions 621 is located closer to the key top 611 side than to that portion, of the thick portion 614, facing the circuit board 7. More specifically, a gap defined between the circuit board 7 and each of the tip portions of the protrusion portions 621 is set as being larger than that defined between the circuit board 7 and that portion, of the thick portion 614, facing the circuit board 7.

Of these gaps, the gap defined between the circuit board 7 and that portion, of the thick portion 614, facing the circuit board 7 is set as such a size that the thick portion 614 does not come in contact with the circuit board 7 even when the desired key top 611 is depressed, so that the protrusion portion 621 depresses the switch 71 corresponding to the desired key top 611 thus depressed.

With such a construction, even when the cross key 6 is inclined by depressing the desired key top 611, the elastic portion 62 corresponding to the desired key top 611 thus depressed is prevented from impairing the inclination of the cross key 6. In addition, the position of each of the tip portions of the protrusion portions 621 (the size of each of the gaps defined between the circuit board 7 and the tip portions of the protrusion portions 621) is adjusted, whereby a stroke amount of cross key 6 can be adjusted without changing the thick size of the entire cross key 6, that is, while the cross key 6 is thinned. In this case, the stroke amount of cross key 6 corresponds to an inclination amount of cross key 6 ranging from a state in which the protrusion portion 621 does not press the corresponding one of the switches 71 to a state in which the protrusion portion 621 presses the corresponding one of the switches 71.

It should be noted that the feeling (for example, the click feeling) obtained when in the phase of the depressing of the desired key top 611, the input manipulation is carried out by pressing the switch 71 corresponding to the desired key top 611 thus depressed by the protrusion portion 621 can also be adjusted by suitably changing the protrusion size and the cross-section area of the each of the protrusion portion 621, and the properties such as the rigidity and the flexibility of the each of the protrusion portion 621.

In addition, those elastic portions 62 are formed integrally with the key main body 61 through the two-color molding, whereby the manufacture processes for the cross key 6, and eventually, the mobile terminal 1 can be simplified as compared with the case where the elastic numbers are stuck to the key main body 61 through an adhesive agent or the like to obtain the elastic portions, respectively.

Here, the elastic material forming each of the elastic portions 62 is not included in the fulcrum point portion 615, and thus the fulcrum point portion 615 is made of the resin composing the key main body 61. In other words, only the areas, of the bottom surface of the cross key 6, corresponding to the key tops 611, respectively, are each made of the elastic material, and the fulcrum point portion 615 is not made of the elastic material. The reason for this is because there is the possibility that when the fulcrum point portion 615 to which the load is applied in the phase of the depressing of the desired key top 611 is made of the elastic material, the strength of the fulcrum point portion 615 cannot be ensured, and thus the cross key 6 pivots in a direction of coming close to or separating away from the circuit board 7 which will be described later, thereby reducing the manipulation feeling. On the other hand, the fulcrum point portion 615 is made of the transparent material having the rigidity, whereby the strength of the fulcrum point portion 615 can be ensured, and thus the reduction of the manipulation feeling can be prevented.

Construction of Switch

Figure 6A:
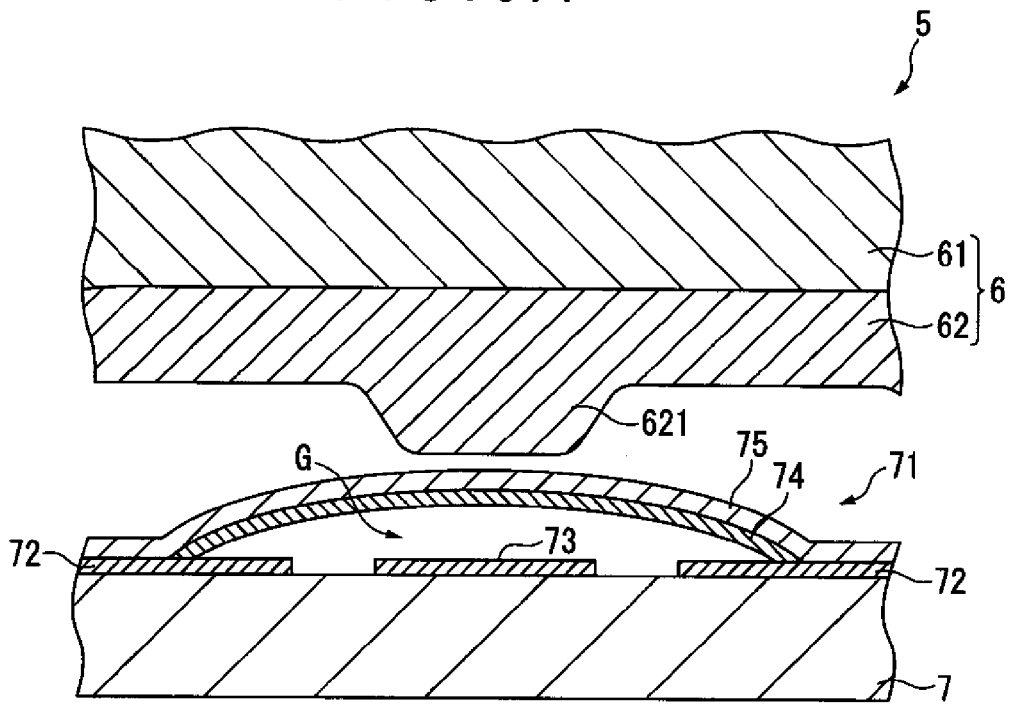
FIG. 6A is a cross sectional view showing a constriction of a switch before being displaced in the mobile terminal according to the first embodiment of the present invention.
Figure 6B:
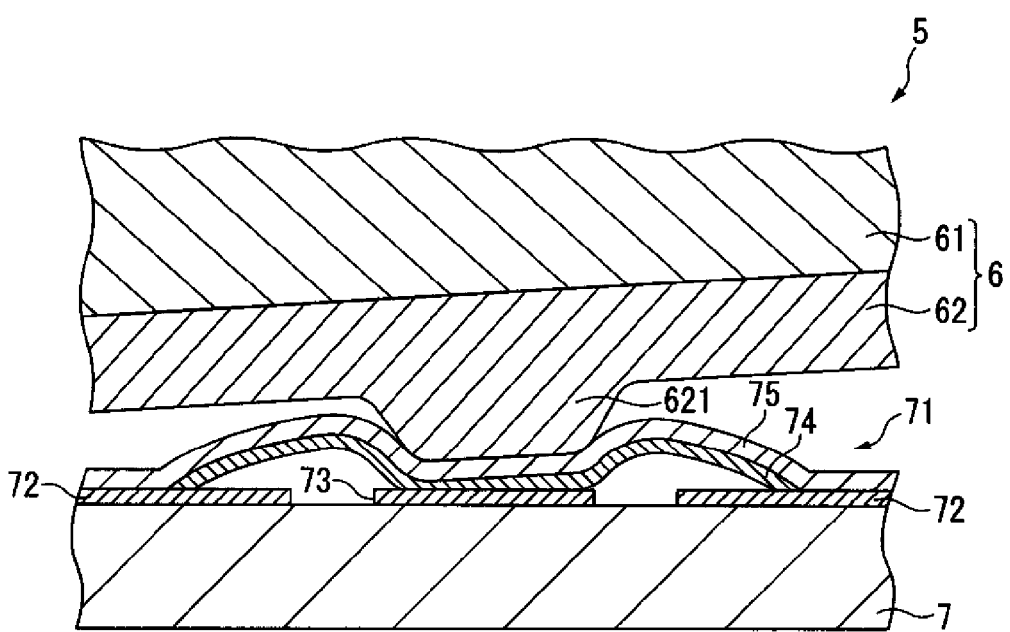
FIG. 6B is a cross sectional view showing the constriction of the switch after being displaced in the mobile terminal according to the first embodiment of the present invention.

FIG. 6A is a cross sectional view showing a state of the switch 71 before being displaced, and FIG. 6B is a cross sectional view showing a state of the switch 71 which is displaced by the depressing force applied thereto from the protrusion portion 621.

The switch 71 corresponds to the detecting portion according to an embodiment of the present invention. Also, as described above, the switches 71 are provided in the positions corresponding to the key tops 611, respectively. The four switches are disposed on the circuit board 7 as a whole. Each of those switches 71, as shown in FIGS. 6A and 6B, includes a first contact portion 72 and a second contact portion 73 which are formed on the circuit board 7, a dome portion 75 which covers a part of the first contact portion 72, and the second contact portion 73, and a third contact portion 74 which is formed inside the dome portion 75.

Although a detailed illustration is omitted in FIGS. 6A and 6B, the first contact point 72 is formed into an approximately circular shape when being planarly viewed. Also, the second contact portion 73 is formed approximately at the center of the first contact portion 72, and is also formed at a predetermined distance from the first contact portion 72 into an approximately circular shape when being planarly viewed.

The third contact portion 74 is formed by applying a material having a conductive property to an inner side of the dome portion 75. Although as shown in FIG. 6A, an end portion of the third contact portion 74 is electrically connected to the first contact portion 72, the third contact portion 74 is separated from the second contact portion 73 through a predetermined gap G. For this reason, in a normal phase (that is, when the switch 71 is not pressed by the protrusion portion 621), the third contact portion 74 and the second contact portion 73 do not electrically contact each other.

The dome portion 75 is provided so as to cover each of the part of the first contact portion 72, and the second contact portion 73, and is made of a metallic material having flexibility. A central position of the dome portion 75 when being planarly viewed approximately agrees with the center of the second contact portion 73. When the dome portion 75 is pressed by the protrusion portion 621 described above in the phase of the depressing of the desired key top 611, as shown in FIG. 6B, the dome portion 75 sags downward in the central portion thereof to be inverted, thereby causing the third contact portion 74 formed inside the dome portion 75 to come in contact with the second contact portion 73. As a result, the second contact portion 73 and the first contact portion 72 are electrically connected to each other through the third contact portion 74, so that a current is caused to flow between the first contact portion 72 and the second contact portion 73. Thus, the circuit board 7 detects that the switch 71 is turned ON in accordance with the flowing of the current between the first contact portion 72 and the second contact portion 73.

The displacement of the dome portion 75 is caused when a level of the pressing force by the protrusion portion 621, that is, the pressing force of the desired key top 611 by the user exceeds a predetermined threshold value. Thus, the user can obtain the click feeling when the displacement of the dome portion 75 is caused in such a manner. For this reason, it is possible to cause the same click feeling as that in the phase of the buckling of the existing elastic body, and thus it is possible to enhance the manipulability of the directional manipulating portion 5. It should be noted that even by adjusting the strength (elastic force) of the dome portion 75, or the size of the gap G, the feeling obtained in the phase of the input manipulation using the desired key top 611 can be adjusted.

Referring back to FIGS. 2 and 3, a main body supporting portion 213 is formed in the area surrounded by the opening portions 212A in the front case 21. In this case, the main body supporting portion 213 approximately cylindrically protrudes outward from the inner surface of the front case 21 (the surface on the side facing the cross key 6), and has approximately a T letter-like shape as a whole. When the front case 21 and the cross key 6 are combined with each other, the main body supporting portion 213 is accommodated in the recess portion 613 described above so as to have a predetermined gap between the periphery of the main body supporting portion 213 and the inner surface of the recess portion 613.

The main body supporting portion 213 and the recess portion 613 are engaged with each other, thereby making it possible to prevent the position of the cross key 6 from being shifted within the chassis 2. In addition thereto, even when the desired key top 611 of the four top keys 611 is depressed, thereby inclining the cross key 6, the cross key 6 can be located on the circuit board 7 so as not to be largely shifted within the chassis 2. Moreover, since the main body supporting portion 213 is engaged with the recess portion 613 formed approximately at the center of the cross key 6, it is possible to prevent the manipulability of the cross key 6 from being impaired.

It should be noted that the predetermined gap between the periphery of the main body supporting portion 213 and the inner surface of the recess portion 613 is set as such a size that when the cross key 6 is inclined, and thus protrusion portion 621 presses the switch 71, each of the periphery and the lower surface of the main body supporting portion 213, and the inner surface of the recess portion 613 are brought into contact with each other. That is to say, since the gap concerned is set in accordance with a displacement amount (inclination amount) of cross key 6, the inclination of the cross key 6 in the phase of depressing of the desired key 611 is prevented from being impeded. As a result, the manipulability of the cross key 6 is prevented from being impaired. In addition thereto, when the cross key 6 is inclined, so that the protrusion portion 621 presses the switch 71, the main body supporting portion 213 is engaged with the recess portion 613, whereby it is possible to regulate that the cross key 6 is further inclined than is necessary. Therefore, not only it is possible to enhance the manipulability of the directional manipulating portion 5, but also it is prevented that the switch 71 is further pressed than is necessary.

Construction of Urging Member

An approximately annular urging member 8 for urging the cross key 6 in a direction of coming close to the circuit board 7 is provided between the cross key 6 and the front case 21 in the circumference of the protrusion portions of the main body supporting portion 213 to the cross key 6 side. The urging member 8 is made of a resin having elasticity, and PORON (registered trademark), for example, can be given as this resin.

A thickness size of the urging member 8 (a size between the inner surface of the front case 21, and the cross key 6) is set in accordance with an inclination amount of cross key 6 (a movement amount of cross key 6 when the cross key 6 is inclined from a state in which the protrusion portion 621 does not press the switch 71 to a state in which the protrusion portion 621 presses the switch 71). The position of the urging member 8 corresponds to the fulcrum point portion 615 of the cross key 6. Also, the urging member 8 urges the approximate center of the cross key 6 toward the circuit board 7.

By providing the urging member 8 in such a manner, the cross key 6 can be prevented from floating above the circuit board 7, and thus the cross key 6 can be stably disposed on the circuit board 7. In addition, when the cross key 6 is inclined by pressing the desired key top 611, the cross key 6 can be returned from the inclined state back to the original state by an urging force of the urging member 8. Moreover, since the urging member 8 is made of the resin, it is possible to thin the directional manipulating portion 5, and eventually, the mobile terminal 1 as compared with the case where a spring member such as a coil spring is used as the urging member 8.

Furthermore, the urging member 8 is disposed so as to cover the periphery of the protrusion portion of the main body supporting portion 213. As a result, even when any one of the key tops 611 is depressed, the urging force against the inclination of the cross key 6 can be reliably caused to act on the position on the side opposite to the key top 611 thus depressed, and the cross key 6 can be reliably returned back to the state before the key top 611 is depressed. In addition, since the urging member 8 is formed into the approximately annular shape, the urging member 8 can be readily mounted to the main body supporting portion 213.

It should be noted that although in the first embodiment, the urging member 8 is made of the resin, the present invention is by no means limited thereto, and the urging member 8 may also be made of a spring member such as a coil spring or a plate spring. In addition, the urging members may also be provided only on directions from the center of the main body supporting portion 213 toward the key tops 611, and between the front case 21 and the cross key 6 without adopting the approximately annular urging member 8. In such a case, since the urging members need not to be disposed over the entire periphery of the main body supporting portion 213, it is possible to reduce the manufacture cost for the urging member.

Operation of Directional Manipulating Portion

Hereinafter, an operation of the directional manipulating portion 5 will be described in detail.

In a state in which none of the four key tops 611 exposed to the outside of the chassis 2 through the opening portions 212A, respectively, is depressed, as shown in FIG. 2, the cross key 6 stands up for itself on the circuit board 7 by both the fulcrum point portion 615 brought into contact with the circuit board 7, and the urging members 8 disposed between the cross key 6 and the front case 21 and in the periphery of the main body supporting portion 213.

When in this case, at least any one of the four key tops 611 is depressed (for example, when the left-hand side key top 611 in FIG. 3 is depressed), as shown in FIG. 3, the cross key 6 is inclined against the urging force of the urging member 8 with the fulcrum point portion 615 as the fulcrum point. In this case, the fulcrum point portion 615 is slightly moved to the end portion side opposite to the end portion of the cross key 6 close to the circuit board 7.

When the cross key 6 is inclined in the manner as described above, the protrusion portion 621 corresponding to the desired key top 611 thus depressed presses the dome portion 75 of the switch 71 corresponding to the protrusion portion 621. The dome portion 75 is inverted at a time point when the level of the pressing force by the protrusion portion 621 exceeds the predetermined threshold value, thereby causing the third contact portion 74 to electrically contact the second contact portion 73. As a result, the electrical conduction is obtained between the second contact portion 73 and the first contact portion 72, and thus, the circuit board 7 outputs a control signal representing the effect that the switch 71 in the pressed portion is turned ON to the terminal main body described above.

Also, when the depressing of the desired key top 611 is released (when a finger is kept clear of the desired key top 611), the pressed cross key 6 is returned from the inclined state back to the original state by both the urging force of the urging member 8, and restoring forces of the elastic portion 62 and the dome portion 75, thereby obtaining the state shown in FIG. 2.

Here, the rigidities of the elastic portion 62 (especially, the protrusion portion 621), the urging member 8 and the switch 71 (especially, the dome portion 75) are suitably set for the purpose of enhancing the manipulability of the directional manipulating portion 5.

Specifically, the rigidities of the elastic portion 62, the urging member 8 and the switch 71 are respectively set in such a way that the rigidity of the elastic portion 62 becomes highest, and the rigidity of the urging member 8 becomes lowest. According to this setting, since the rigidity of the elastic portion 62 (the protrusion portion 621) is highest, in the phase of the depressing of the desired key top 611, the dome portion 75 of the switch 71 can be reliably pressed, and thus the depressing of the desired key top 611 can be reliably detected by the switch 71. In addition, in this case, by the displacement of the dome portion 75, the click feeling can be caused for the user. Moreover, since the rigidity of the urging member 8 is lowest, by the urging force of the urging member 8, the inclination of the cross key 6 in the phase of the depressing of the desired key top 611 can be prevented from being impeded. Therefore, it is possible to further enhance the manipulability of the directional manipulating portion 5, and eventually, the mobile terminal 1.

In accordance with the mobile terminal 1 according to the first embodiment of the present invention described above, the following effects can be obtained.

The flat plate-like elastic portions 62 are provided integrally with the key main body 61, which results in that a movement amount of cross key 6 can be reduced while a stroke amount of cross key 6 in the phase of the depressing of the desired key top 611 is ensured as compared with the case where the existing contact rubbers are used. As a result, it is possible to thin the directional manipulating portion 5, and eventually, the mobile terminal 1. In this case, the elastic portion 62 is elastically displaced in accordance with the depressing of the desired key top 611, thereby making it possible to obtain the soft click feeling for the user. In addition, the switch 71 is provided with the dome portion 75, whereby the click feeling can be caused for the user in the phase of the depressing of the desired key top 611. In addition thereto, the cross key 6 is returned from the inclined state back to the original state by not only the restoring forces of the elastic portion 62 and the dome portion 75, but also the urging force of the urging member 8. As a result, the mobile terminal 1 can be thinned without impairing the manipulation feeling.

In addition, the urging member 8 for urging the cross body 6 in the direction of coming close to the circuit board 7 is provided so as to correspond to the position corresponding to the fulcrum point portion 615, that is, the position of the cross key 6 surrounded by the four key tops 611 (the position approximately at the center when the cross key 6 is planarly viewed). As a result, the urging force can be made to efficiently act on the cross key 6, thereby suitably disposing the cross key 6 on the circuit board 7. In addition, not only the number of components or parts can be reduced, but also the construction of the directional manipulating portion 5, and eventually, the mobile terminal 1 can be simplified as compared with the case where the contact rubbers are provided in the positions corresponding to the key tops 611, respectively, and the cross key 6 is urged to the side close to the inner surface of the front case 21. Moreover, since the urging member 8 is made of the resin having the elasticity, the directional manipulating portion 5, and eventually, the mobile terminal 1 can be thinned as compared with the case where the coil spring or the like is used as the urging member.

2. Second Embodiment

Hereinafter, a second embodiment of the present invention will be described in detail.

A mobile terminal according to the second embodiment of the present invention has the same construction as that of the mobile terminal 1 of the first embodiment described above. However, although in the mobile terminal 1 of the first embodiment, the elastic portions 62 of the cross key 6 have the shapes corresponding to the key tops 611, respectively, the mobile terminal of the second embodiment is different from the mobile terminal 1 of the first embodiment in that the shapes of the elastic portions are mainly changed. It should be noted that in the following description, the same portions or approximately the same portions as those in the first embodiment previously described are designated by the same reference numerals, respectively, and a description thereof is omitted here for the sake of simplicity.

Figure 7:
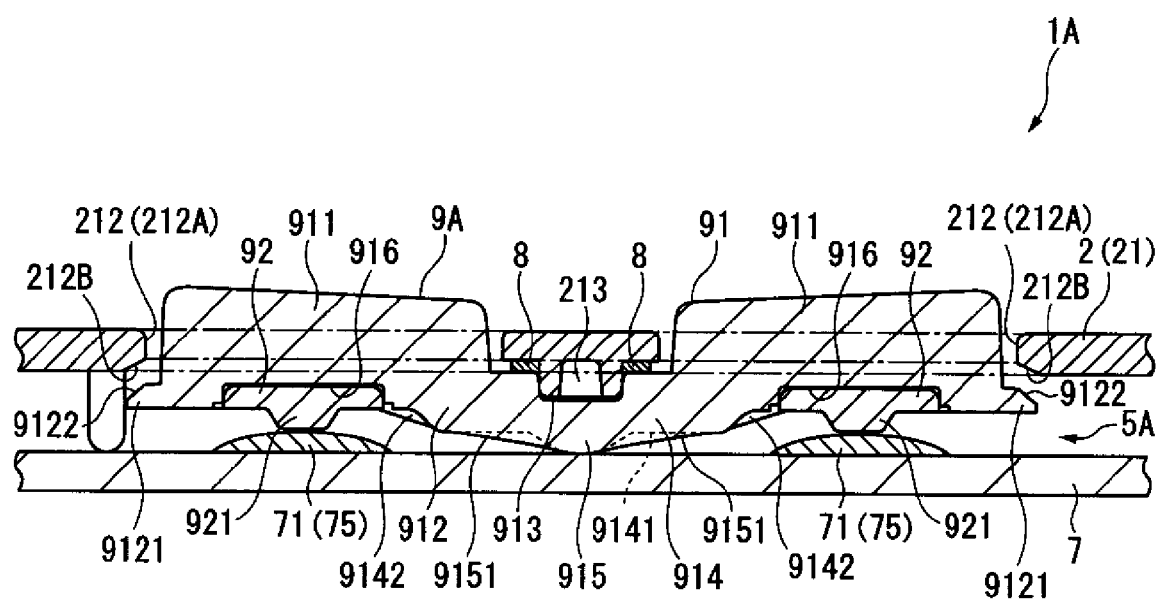
FIG. 7 is a cross sectional view showing a directional manipulating portion before a key top is depressed in a mobile terminal according to a second embodiment of the present invention.
Figure 8:
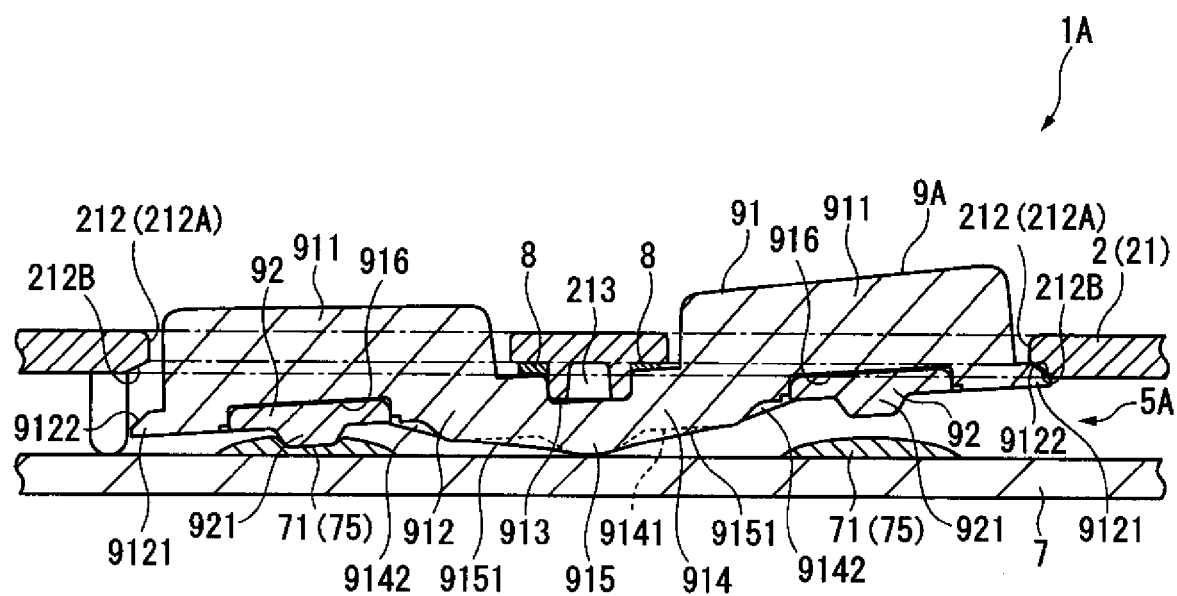
FIG. 8 is a cross sectional view showing the directional manipulating portion after the key top is depressed in the mobile terminal according to the second embodiment of the present invention.

FIGS. 7 and 8 are respectively cross sectional views each showing a construction of a directional manipulating portion 5A with which the mobile terminal 1A of the second embodiment is provided. Of FIGS. 7 and 8, FIG. 7 is a cross sectional view showing a state in which a cross key 9A composing a directional manipulating portion 5A is not depressed, and FIG. 8 is a cross sectional view showing a state in which the cross key 9A composing the directional manipulating portion 5A is depressed.

As shown in FIGS. 7 and 8, the mobile terminal 1A of the second embodiment has the same construction as that of the mobile terminal 1 of the first embodiment described above except that the mobile terminal 1A includes the directional manipulating portion 5A instead of including the directional manipulating portion 5. In addition, the directional manipulating portion 5A corresponds to the manipulating portion according to an embodiment of the present invention, and has the same construction as that of the directional manipulating portion 5 except that the directional manipulating portion 5A includes a cross key 9A instead of including the cross key 6.

Figure 9:
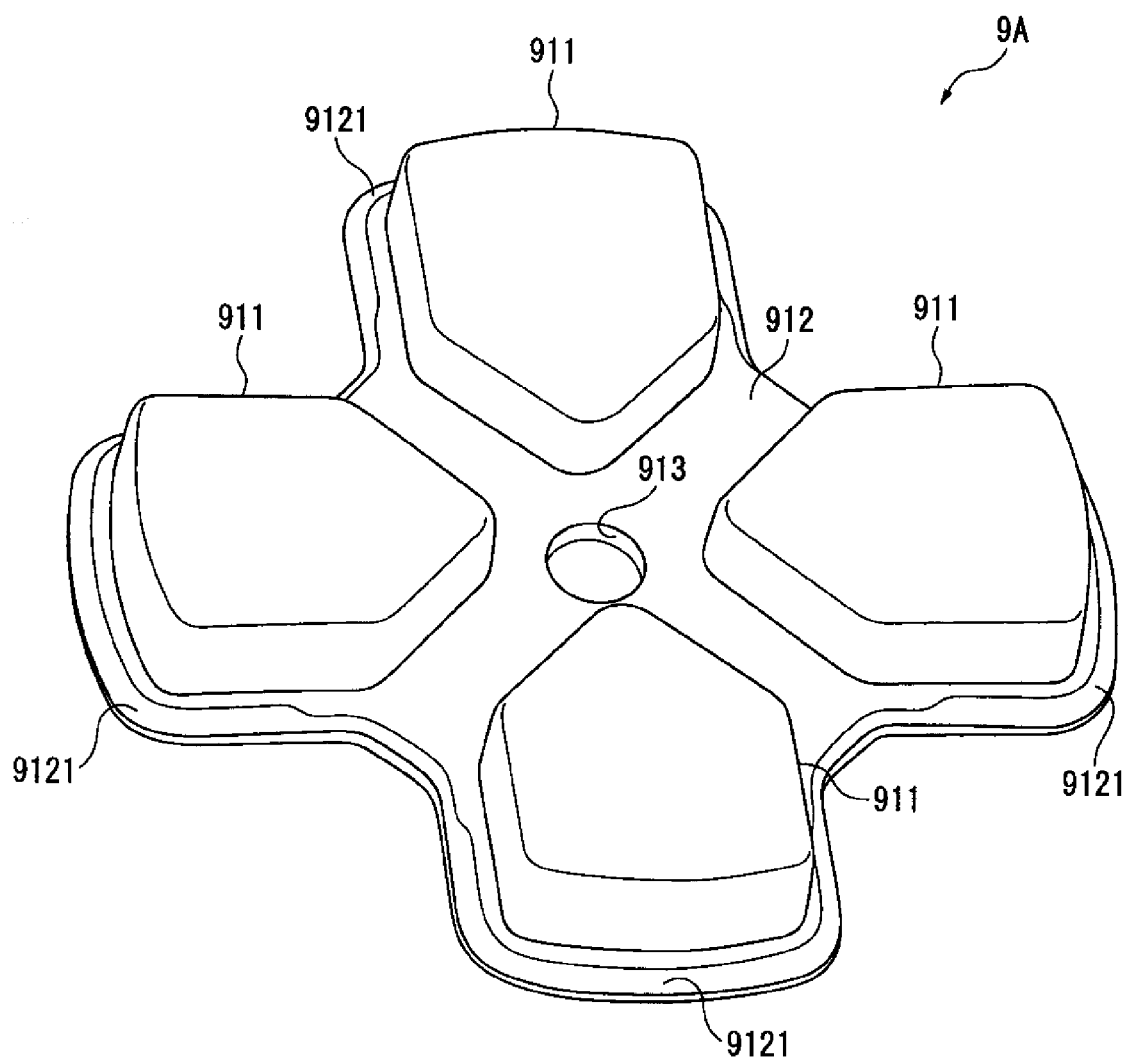
FIG. 9 is a perspective view of a cross key in the mobile terminal according to the second embodiment of the present invention when being viewed from above.
Figure 10:
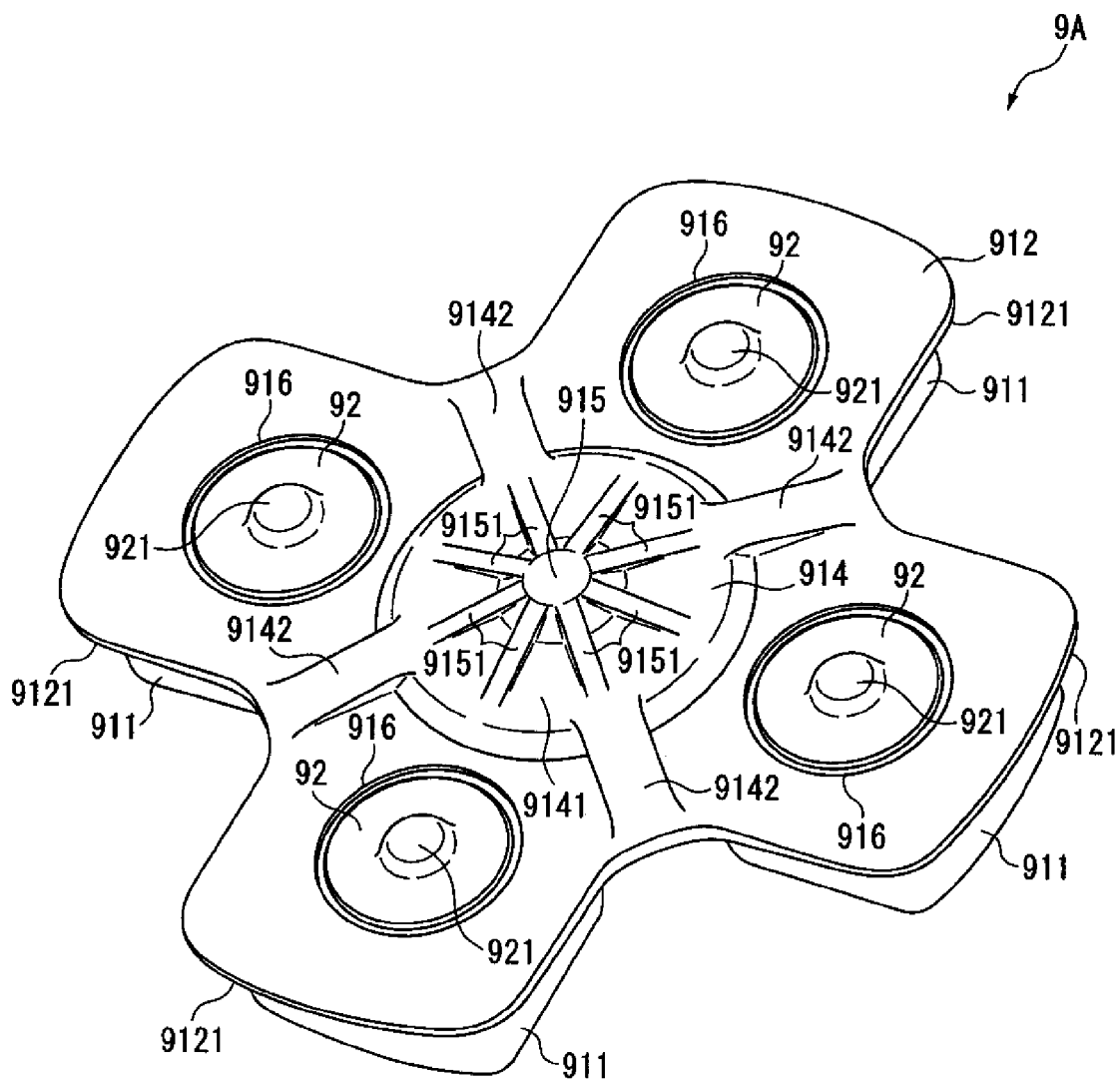
FIG. 10 is a perspective view of the cross key in the mobile terminal according to the second embodiment of the present invention when being viewed from below.

FIG. 9 is a perspective view when the cross key 9A is viewed from above, and FIG. 10 is a perspective view when the cross key 9A is viewed from below.

Similarly to the case of the cross key 6, the cross key 9A is accommodated in the chassis 2 except for a plurality of key tops 911 exposed to the outside of the chassis 2 through opening portions 212A, respectively. Also, the cross key 9A is included in accordance with the depressing of the desired key top 911, thereby pressing one of the switches 71 corresponding to the desired key top 911 thus depressed, and provided on the circuit board 7. The cross key 9A, as shown in FIGS. 9 and 10, includes an approximately cross-shaped key main body 91 (refer to FIGS. 9 and 10), and elastic portions 92 (refer to FIG. 10).

The key main body 91 includes a plurality of key tops 911 (the four key tops 911 in the second embodiment) which have approximately the same shapes as those of the key tops 611 described in the first embodiment, and a base portion 912 through which the key tops 911 are connected to one another. In this case, a plurality of key tops 911, and the base portion 312 are formed integrally with each other. It is noted that although in the second embodiment, the four key tops 911 and the base portion 912 are integrally molded by using a colored resin, thereby forming a key main body 91, the four key tops 911, for example, may be bonded to the base portion 912 to be integrated with the base portion 912 instead.

Those four key tops 911 are disposed in positions corresponding to vertices of the base portion having approximately cross shape when being planarly viewed, respectively. In addition, a tapered flange portion 9121 is formed in an outer periphery of the base portion 912 similarly to the case of the base portion 612 of the first embodiment described above. In this case, the tapered flange portion 9121 extends to the outside of each of the four key tops 911, and a thickness size thereof becomes smaller toward the outside of the base portion 912. An upper surface of the tapered flange portion 9121 is an inclined surface 9122, and the inclined surface 9122 is inclined so as to come closer to the lower side toward the outside.

In addition, the base portion 912 includes a recess portion 913 (refer to FIG. 9), a thick portion 914 (refer to FIG. 10), a fulcrum point portion 915 (refer to FIG. 10), and a recess portion 916 (refer to FIG. 10).

As shown in FIG. 9, the recess portion 913 is formed into an approximately circular shape when being planarly viewed approximately at a center of the base portion 912 surrounded by the four key tops 911. The main body supporting portion 213 described above is inserted into the recess portion 913.

As shown in FIG. 10, the thick portion 914 is formed approximately at a center of a bottom surface side (a side opposite to a side on which the four key tops 911 are located) of the base portion 912. In other words, the thick portion 914 is formed so as to correspond to an area surrounded by the four key tops 911. The thick portion 914 is formed into an approximately circular shape when being viewed from a bottom surface 9141 side, and a surface thereof facing the circuit board 7 is formed so as to be approximately flat. In addition, four bridge portions 9142 are formed in the thick portion 914. In this case, the four bridge portions 9142 extend along four directions (each of the four directions extending from the center of the base portion 912 to a portion between each adjacent two key tops 911) as four diagonal directions of the eight directions described above in the cross key 9, respectively. Also, the bottom surface 9141 and the bottom surface of the base portion 912 are connected to each other through the four bridge portions 9141. The circumference of the fulcrum point portion 915 is reinforced by such a thick portion 914.

The fulcrum point portion 915 is formed approximately at a center of the thick portion 914, that is, in a position corresponding to the recess portion 913 on the bottom surface side of the base portion 912. Also, the fulcrum point portion 915 is formed in the position corresponding to the recess portion 913 so as to have an approximately conical shape which bulges toward the lower side (the side facing the circuit board 7). Also, a tip portion of the fulcrum point portion 915 is brought into contact with the circuit board 7. Such a fulcrum point portion 915 has a plurality of bridge portions 9151 (the eight bridge portions 9151 in this case). Of the eight bridge portions 9151, the four bridge portions 9151 are formed along the directions extending from the fulcrum point portion 915 toward the four key tops 911, and the remaining four bridge portions 9151 are formed along the directions each extending between each adjacent two key tops 911. The extending directions of the eight bridge portions 9151 correspond to the eight directions described above, respectively, which can be manipulated by the cross key 9A.

The recess portions 916 are formed in positions, on the bottom surface side of the base portion 912, corresponding to the four key tops 911, respectively. Giving a detail description, each of the four recess portions 916 is formed into an approximately circular shape, when being planarly viewed, having a center at a position which is slightly shifted from an approximately central portion of corresponding one of the four key tops 911. Those four recess portions 916 are bonded to the four elastic portions 92, respectively, by using an adhesive agent or the like.

Each of the four elastic portions 92 corresponds to the elastic body according to an embodiment of the present invention, and is made of an elastic material (such as a silicon rubber). Each of the four elastic portions 92, as shown in FIG. 8, is formed into an approximately circular shape when being planarly viewed at a size corresponding to corresponding one of the four recess portions 916. That is to say, although each of the four elastic portions 62 described above is formed so as to correspond to the size and the shape of corresponding one of the four key tops 911, each of the elastic portions 92 is formed at a size smaller than that of each of the four polygonal key tops 911. Also, the four elastic portions 92 are mounted closer to the key top 911 side than to the plan position of a portion (a bottom surface 9141), of the thick portion 914 described above, facing the circuit board 7.

Those four elastic portions 92 have approximately cylindrical protrusion portions 921, respectively, each protruding approximately from the center of the surface facing the circuit board 7. Those four protrusion portions 921 are located outside the centers of the four key tops 911, respectively. Also, each of those four protrusion portions 921 is disposed in a position where one of those four protrusion portions 921 corresponding to the desired key top 911 depressed presses an approximately central portion of the corresponding one of the dome portions 75 when the cross key 9A is depressed. A position of a tip portion of the protrusion portion 921 in the protrusion direction, that is, a position of the tip portion of the protrusion portion 921 adapted to press the switch 71 is located closer to the key top 911 side than to the plan position of the portion (the bottom surface 9141), of the thick portion 914, facing the circuit board 7.

Operation of Directional Manipulating Portion

Hereinafter, an operation of the directional manipulating portion 5A will be described in detail with reference to FIGS. 7 and 8.

When none of the four key tops 911 is depressed, as shown in FIG. 7, the cross key 9A stands for itself on the circuit board 7 in a state in which the fulcrum point portion 915 is brought into contact with the circuit board 7 by the urging force of the urging member 8 provided in the periphery of the main body supporting portion 213 inserted into the recess portion 913.

When at least any one of the key tops 911 (for example, the left-hand side key top 911 in FIGS. 7 and 8) is depressed in this state, the cross key 9A, as shown in FIG. 8, is pivoted about the fulcrum point portion 915 as the fulcrum point against the urging force of the urging member 8.

Along with the pivotal movement of the cross key 9A, the protrusion portion 921 corresponding to the key top 911 thus depressed presses the dome portion 75 located on the lower side of the directional manipulating portion 5A. As a result, the circuit board 7 outputs a control signal representing the effect that the switch 71 corresponding to the depressing position is turned ON.

On the other hand, when the depressing of the desired key top 911 is released, the cross key 6 is returned back to the original state shown in FIG. 7 by both the urging force of the urging member 8, and the restoring forces of the elastic portion 92 and the dome portion 75.

Here, the rigidities of the elastic portion 92, the urging member 8 and the dome portion 75 are suitably set for the purpose of enhancing the manipulability of the directional manipulating portion 5A similarly to the case of the directional manipulating portion 5 described above.

Specifically, the rigidities of the elastic portion 92, the urging member 8 and the dome portion 75 are set in such a way that the rigidity of the elastic portion 92 becomes highest, and the rigidity of the urging member 8 becomes lowest. As a result, the dome portion 75 can be reliably pressed by the elastic portion 92 (especially, the protrusion portion 921) having the highest rigidity. In addition thereto, the click feeling can be caused for the user by the displacement of the dome portion 75. In addition, since the rigidity of the urging member 8 is lowest, not only the inclination of the cross key 9A can be prevented from being impeded by the urging force of the urging member 8, but also the cross key 9A can be reliably returned from the inclination state back to the original state before the desired key top 911 is depressed. Therefore, it is possible to further enhance the manipulability of the directional manipulating portion 5A, and eventually, the mobile terminal 1.

As set forth hereinabove, according to the mobile terminal 1A of the second embodiment, it is possible to offer the same effects as those of the mobile terminal 1 of the first embodiment described above.

3. Third Embodiment

Hereinafter, a third embodiment of the present invention will be described in detail.

A mobile terminal of the third embodiment has the same construction as that of the mobile terminal 1A of the second embodiment described above. However, the mobile terminal 1A of the second embodiment has the construction that the cross key 9A is urged by the urging member 8 disposed in the periphery of the main body supporting portion 213. On the other hand, in the mobile terminal of the third embodiment, a cross key is urged by urging members disposed so as to correspond to an outer periphery of the cross key. Thus, in the mobile terminal of the third embodiment is different from the mobile terminal 1A of the second embodiment in this point. It should be noted that in the following description, the same portions or approximately the same portions as those in each of the first and second embodiments previously described are described by the same reference numerals, respectively, and a description thereof is omitted here for the sake of simplicity.

Figure 11:
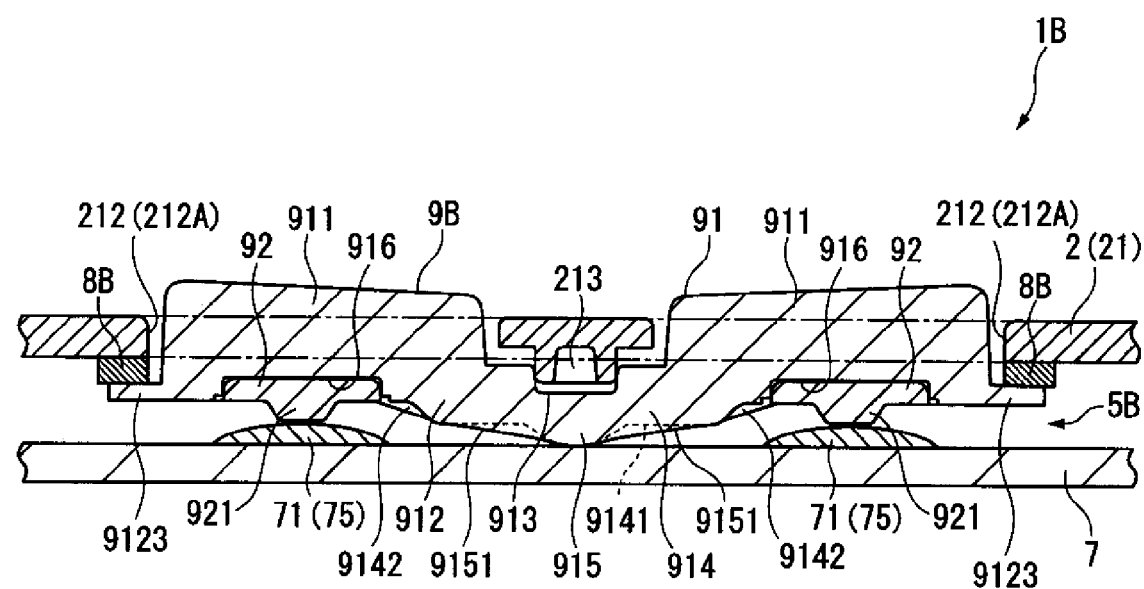
FIG. 11 is a cross sectional view showing a directional manipulating portion before a key top is depressed in a mobile terminal according to a third embodiment of the present invention.
Figure 12:
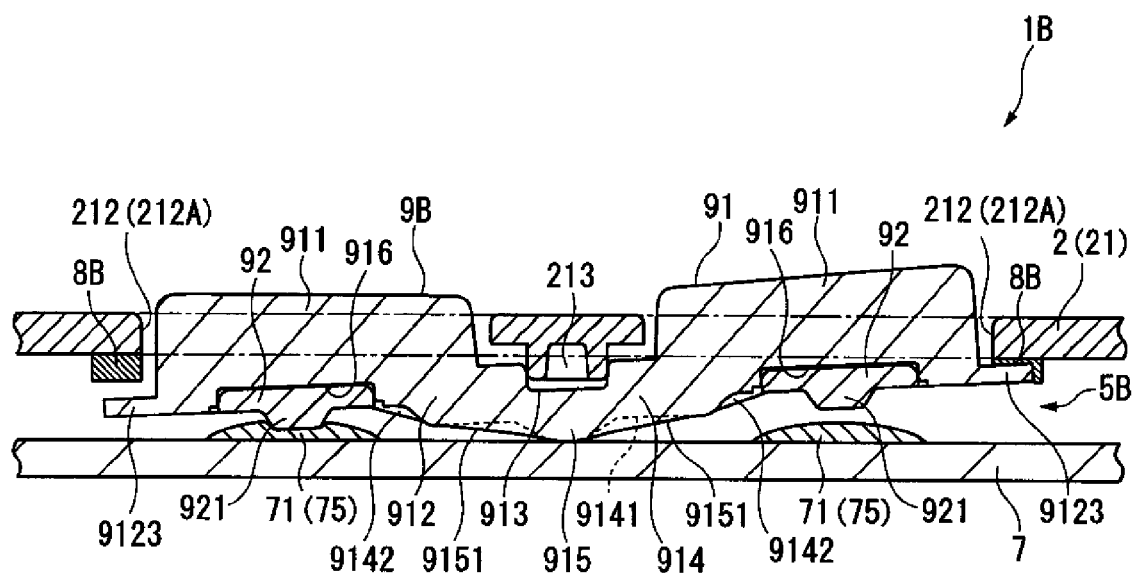
FIG. 12 is a cross sectional view showing the directional manipulating portion after the key top is depressed in the mobile terminal according to the third embodiment of the present invention.

FIGS. 11 and 12 are respectively cross sectional views each showing a construction of a directional manipulating portion 5B with which the mobile terminal 1B of the third embodiment is provided. Of FIGS. 11 and 12, FIG. 11 is the cross sectional view showing a state in which none of the four cross keys 9B is depressed, and FIG. 12 is the cross sectional view showing a state in which the cross key 9B is depressed.

The mobile terminal 1B of the third embodiment has the same construction as that of the mobile terminal 1A of the second embodiment except that the mobile terminal 1B includes a directional manipulating portion 5B instead of including the directional manipulating portion 5A. The directional manipulating portion 5B corresponds to the manipulating portion according to an embodiment of the present invention, and as shown in FIGS. 11 and 12, includes a cross key 9B, the circuit board 7 and urging members 8B.

Of the cross key 9B, the circuit board 7 and the urging members 8B, the cross key 9B has the same construction as that of the cross key 9A except that the cross key 9B includes a flange portion 9123 which extends outward as compared with the case of the flange portion 9121 described above.

In addition, each of the urging members 8B is made of the same material as that of each of the urging members 8 described above, and urges the cross key 9B toward the circuit board 7. The urging members 8B are mounted to the end edges of the opening portions 212A, respectively, so as to face the flange portions 9123.

Specifically, the urging members 8B are provided so as to be symmetrical with respect to the center of the cross key 9B so as to correspond to positions, respectively, in the cross key 9B, where the depressing can be carried out. That is to say, the urging members 8B are disposed so as to face both areas of the flange portions 9123 located on straight lines extending from the center of the cross key 9B toward the four key tops 911, and areas of the flange portions 9123 located on straight lines each passing between each adjacent two key tops 911 from the center of the cross key 9B.

For this reason, the urging members 8B are located in eight directions in total. Of the eight directions, four directions extend from the center of the key main body 91 toward the four key tops 911 in the case where the key tops 911 are depressed independently, and remaining four directions extend from the center of the key main body 91 toward the depressed positions in the case where adjacent two key tops 911 are depressed at the same time. It is noted that the urging members 8B may also be provided so as to correspond to all the areas in which the flange portions 9123 are formed, respectively, or may also be provided on either four directions of the eight directions.

When in such a directional manipulating portion 5B, none of the four key tops 911 is depressed, as shown in FIG. 11, the cross key 9B stands up for itself on the circuit board 7 in a state in which the fulcrum point portion 915 is brought into contact with the circuit board 7 by the urging forces of the urging members 8B brought into contact with the upper surfaces of the flange portions 9123, respectively.

When at least any one of the four key tops 911 (for example, the left-hand side key top 911 in FIGS. 11 and 12) is depressed in this state, as shown in FIG. 12, the cross key 9B is pivoted about the fulcrum point portion 915 in the depressing direction against the urging force of the corresponding one of the urging members 8B on the side opposite to the depressing position. In this case, the protrusion portion 921 corresponding to the key top 911 thus depressed presses the corresponding one of the switches 71, and the circuit board 7 detects that the desired key top 911 is depressed.

After that, when the depressing for the desired key top 911 is released, the cross key 9B is returned back to the original state before the desired key top 911 is depressed (the state shown in FIG. 11) by both the restoring forces of the switch 71 (the down portion 75) and the elastic portion 92, and the urging force of the urging member 8B on the side opposite to the depressing position.

As set forth hereinabove, according to the mobile terminal 1B of the third embodiment, it is possible to offer the same effects as those of each of the mobile terminals 1 and 1A of the first and second embodiments described above.

It should be noted that although in the mobile terminal 1B, the four opening portions 212A through which the four key tops 911 are exposed, respectively, are formed in the front case 21 so as to correspond to the four key tops 911, respectively, there may also be adopted instead such a construction that the four key tops 911 are exposed through one opening portion.

Figure 13:
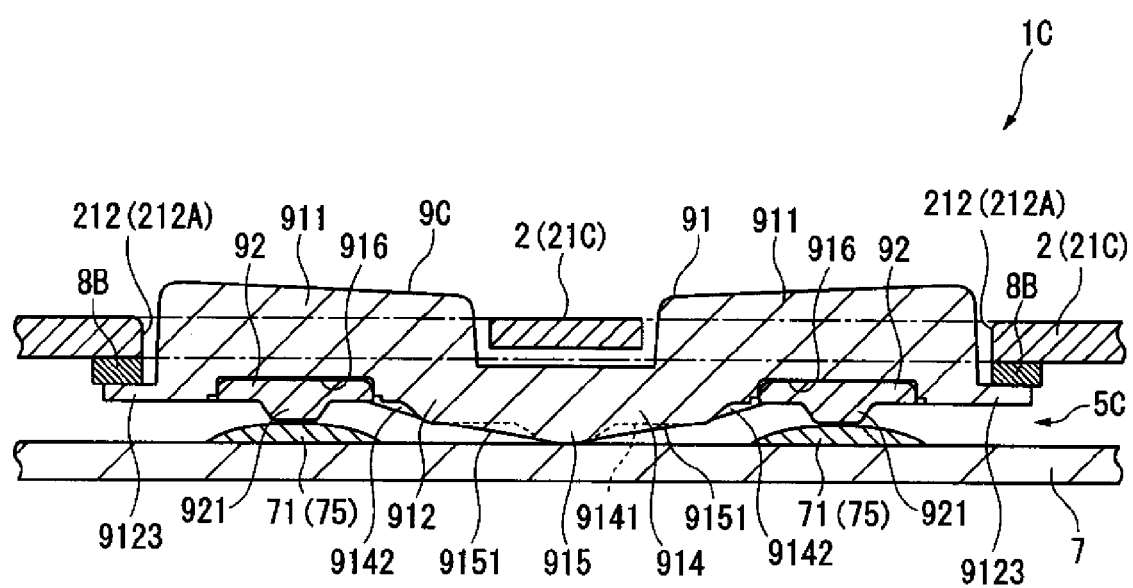
FIG. 13 is a cross sectional view showing a directional manipulating portion before a key top is depressed in a mobile terminal according to a change of the third embodiment.
Figure 14:
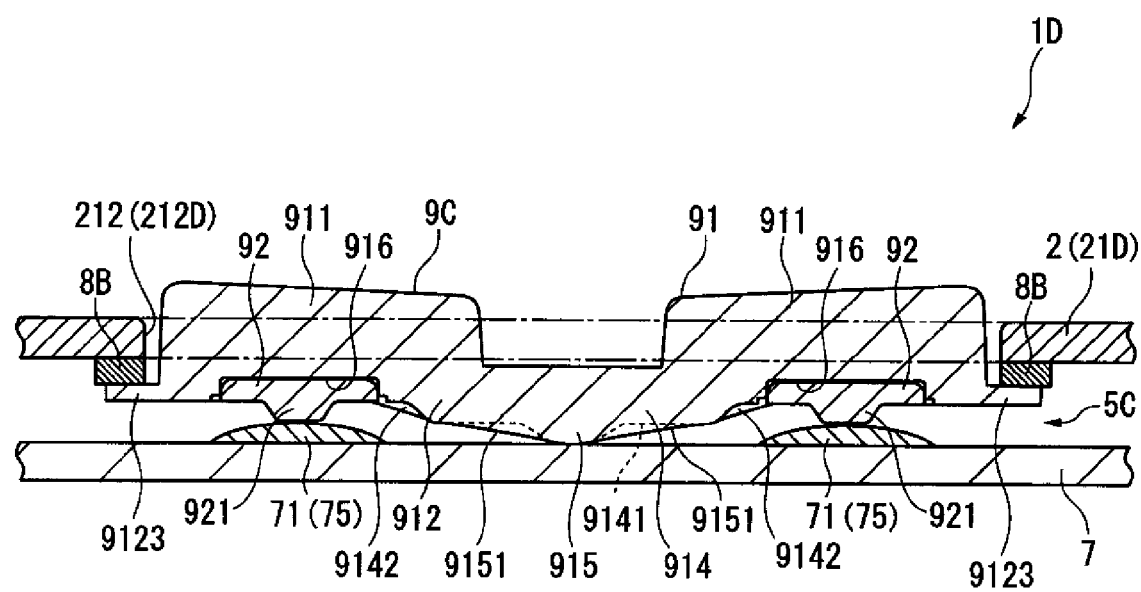
FIG. 14 is a cross sectional view showing a directional manipulating portion before a key top is depressed in a mobile terminal according to another change of the third embodiment.

FIGS. 13 and 14 are respectively cross sectional views showing mobile terminals 1C and in as one and another changes of the mobile terminals 1B of the third embodiment.

Hereinafter, the mobile terminals 1C and 1D as the one and another changes of the mobile terminals 1B of the third embodiment will be described in detail.

As shown in FIG. 13, the mobile terminal 10 of the one change of the mobile terminals 1B of the third embodiment has the same construction as that of the mobile terminal 1B except that the mobile terminal 1C includes a front case 21C and a directional manipulating portion 5C instead of including the front case 21 and the directional manipulating portion 5B. In addition, the directional manipulating portion 5C has the same construction as that of the directional manipulating portion 5B except that the directional manipulating portion 5C includes a cross key 9C instead of including the cross key 9B.

The front case 21C has four opening portions 212A through which the four key tops 911 are exposed to the outside of the chassis 2, respectively, similarly to the case of the front case 21. However, no main key supporting portion 213 is provided in the portion surrounded by the four key tops 911 exposed to the outside of the chassis 2.

In addition, although the cross key 9C has the same construction as that of the cross key 9B, the recess portion 913 which is formed approximately at the center of the cross key 9B is not formed in the cross key 9C.

As shown in FIG. 14, the mobile terminal 1D of the another change of the mobile terminal 1B of the third embodiment has the same construction as that of the mobile terminal 10 except that the mobile terminal 1D includes a front case 21D instead of including the front case 21.

The front case 21D has the same construction as that of the front case 21. However, the front case 21D includes one opening portion 212D through which all the four key tops 911 of the cross key 9C are exposed to the outside of the chassis 2 instead of including the four opening portions 212A as with each of the first to third embodiments. Along with this construction, the front case 21D includes none of the portion surround by the four key tops 911, and the main body supporting portion 213 provided in that portion.

The four key tops 911 are all located within such an opening portion 212D, and thus an end edge of the opening portion 212D is formed into an approximately cross-like shape. That is to say, the four key tops 911 and the central portion of the base portion 912 surrounded by the four key tops 911 are both exposed to the outside of the chassis 2 through the opening portion 212D. The urging members 8B described above which are brought into contact with the respective flange portions 9123 facing the inner surface of the front case 21D are provided at the end edge of the opening portion 212D, and in the inner surface of the front case 21D.

In each of the mobile terminals 1C and 1D as well, it is possible to obtain the same effects as those in the mobile terminal 1B of the third embodiment.

It should be noted that although each of the opening portion 212D and the cross key 9C is formed into the approximately cross-like shape when being planarly viewed, the present invention is by no means limited thereto, and thus each of the opening portion 212D and the cross key 9C may be formed into an approximately circular shape when being planarly viewed. In this case, there may be also be adopted instead a construction that the four urging members 8B are provided in the end edge of the opening portion 212D so as to face the flange portion 9123 which is formed into the approximately circular shape along the end edge of the cross key. In this case as well, the shape of each of the urging members is by no means limited to the approximately circular shape. Thus, the urging force of the urging member can be made to suitably act on the corresponding one of the cross keys as long as the urging member(s) is (are) disposed in at least any one of the positions on the eight directions described above (preferably, on at least four directions described above).

4. Fourth Embodiment

Hereinafter, a fourth embodiment of the present invention will be described in detail.

A mobile terminal according to the fourth embodiment of the present invention has the same structure as that of the mobile terminal 1A of the second embodiment described above. The mobile terminal 1A of the Second embodiment described above includes the four urging members 8 which are disposed between the front case 21 and the cross key 9A, and which serve to urge the cross key 9A toward the circuit board 7. On the other hand, the mobile terminal of the fourth embodiment includes an urging member 8E which is disposed between the cross key 9A and the circuit board 7, and which serves to urge the cross key 9A toward the front case 21. The mobile terminal of the fourth embodiment is different from the mobile terminal 1A of the second embodiment in this point. It should be noted that in the following description, the same portions or approximately the same portions as those in the first to third embodiments previously described are designated by the same reference numerals, respectively, and a description thereof is omitted here for the sake of simplicity.

Figure 15:
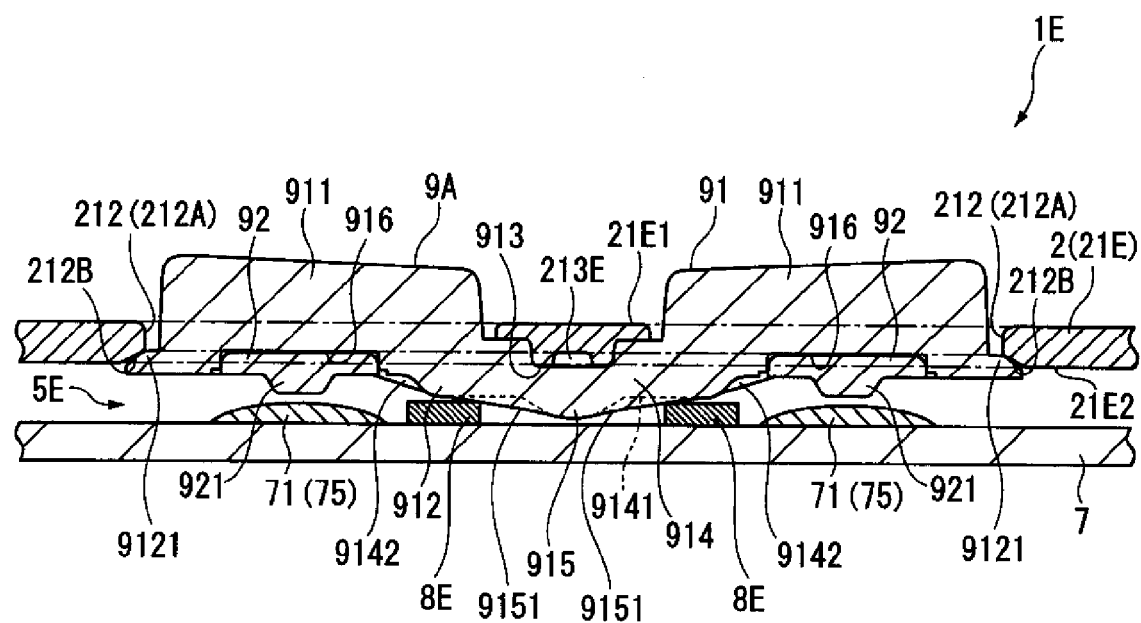
FIG. 15 is a cross sectional view showing a directional manipulating portion before a key top is depressed in a mobile terminal according to a fourth embodiment of the present invention.

FIG. 15 is a cross sectional view showing a construction of a directional manipulating portion 5E with which the mobile terminal 1E of the fourth embodiment is provided. In other words, FIG. 15 is the cross sectional view showing a state in which the cross key 9A composing the directional manipulating portion 5E is not yet depressed.

As shown in FIG. 15, the mobile terminal 1E of the fourth embodiment has the same construction and functions as those of the mobile terminal 1A of the second embodiment described above except that the mobile terminal 1E includes a front case 21E and the directional manipulating portion 5E instead of including the front case 21 and the directional manipulating portion 5A.

The front case 21E has the same construction as that of the front case 21 except that the front case 21E includes a main body supporting portion 213E instead of including the main body supporting portion 213.

Similarly to the case of the main body supporting portion 213, the main body supporting portion 213E is formed into an approximately cylindrical shape which protrudes toward the circuit board 7 in an area 21E1, in the front case 21E, surrounded by the four opening portions 212A. A tip portion of the main body supporting portion 213E is located approximately in the same position as that of a lower surface 21E2 (the lower surface 21E2 lying with the exception of the area 21E1) of the front case 21E. For this reason, the tip portion of the main body supporting portion 213E, and the lower surface 21E2 are flush with each other. Such a main body supporting portion 213E is inserted into the recess portion 913 of the cross key 9A.

FIG. 16 is a top plan view showing the urging member 8E disposed on the circuit board 7.

The directional manipulating portion 5E corresponds to the manipulating portion according to an embodiment of the present invention, and includes the circuit board 7, the urging member 8E, and the cross key 9A.

Of the circuit board 7, the urging member 8E, and the cross key 9A, as shown in FIG. 16, the urging member 8E is made of the same material as that of each of the urging members 8, and is formed into an annular shape. Also, the urging member 8E is mounted onto the circuit board 7. Giving a detail description, the urging member 8E is mounted onto an area, of the circuit board 7, surrounded by the four switches 71 in such a way that a center of this area, and a center of the urging member 8E agree with each other. The center of the urging member 8E approximately agrees with the position of the fulcrum point portion 915 as the center of the cross key 9A disposed on the urging member 8E. Such an urging member 8E is brought into contact with each of the bridge portions 9142 and 9151, thereby urging the cross key 9A toward the front case 21E.

Specifically, in a state in which no cross key 9A is depressed (in a non-depressing state), as shown in FIG. 15, the cross key 9A is urged toward the front case 21E by the urging member 8E. In this case, the main body supporting portion 213E is inserted into the recess portion 913, and thus the lower surface of the area 21E1 lying with the exception of the main body supporting portion 213E, and the end edge of the recess portion 913 are brought into contact with each other. In addition, although in this state, the inclined surface 9122 (refer to FIG. 7) of the flange portion 9121, and the inclined portion 212B are brought into contact with each other, the fulcrum point portion 915 and the circuit board 7 are separated away from each other.

Here, when any one of the four key tops 911 is depressed, the cross key 9A is moved in the direction of coming close to the circuit board 7 against the urging force of the urging member 8E, so that the fulcrum point portion 915 is brought into contact with the circuit board 7. Also, the cross key 9A is inclined on the depressed side with the fulcrum point portion 915 as the fulcrum point, so that one of the protrusion portions 921 corresponding to the depressed key top 911 presses the dome portion 75. As a result, it is detected by the circuit board 7 that the input manipulation is carried out by using the cross key 9A.

When the finger of the user is kept clear of the key top 911 thus depressed, the side of the key top 911 thus depressed in the cross key 9A is urged to the front case 21E side by the restoring of the area, of the urging member 8E, corresponding to the key top 911 thus depressed. As a result, the cross key 9A is restored back to the non-depressing (original) state shown in FIG. 15. It should be noted that this also applies to the case where each adjacent two key tops 911 are depressed.

As set forth hereinabove, according to the mobile terminal 1E of the fourth embodiment, it is possible to offer the same effects as those in the mobile terminal 1A of the second embodiment described above. In addition thereto, since the larger urging member 8E than the urging member 8 is adopted, the urging force by which the cross key 9A is returned back to the non-depressing state can be made to reliably act on the cross key 9A.

5. Embodiments of Manipulating Apparatus

Here, a manipulating apparatus according to an embodiment of the present invention includes the chassis 2 provided with the directional manipulating portion 5 with which the input manipulation is carried out. In this case, the directional manipulating portion 5 includes: a plurality of key tops 611 exposed to the outside of the chassis 2 through the opening portions 212A, respectively, which the chassis 2 has, and the key main body 61 having the base portion 612 through which the plurality of key tops 611 are connected to one another within the chassis 2; the circuit board 7 in which a plurality of switches 71 are disposed in positions corresponding to the plurality of key tops 611, respectively; and a plurality of flat plate-shaped elastic portions 62 interposed between the key main body 61 and the plurality of switches 71. The plurality of elastic portions 62 are provided integrally with the base portion 612.

In addition, a manipulating apparatus according to another embodiment includes the chassis 2 provided with the directional manipulating portion 5 with which the input manipulation is carried out. In this case, the directional manipulating portion 5 includes: a plurality of key tops 611 exposed to the outside of the chassis 2 through the opening portions 212A, respectively, which the chassis 2 has, and the key main body 61 having the base portion 612 through which the plurality of key tops 611 are connected to one another within the chassis 2; and the circuit board 7 having a plurality of switches 71 for detecting the input manipulation using the desired key top(s) 611, the plurality of switches 71 being disposed in positions corresponding to the plurality of key tops 611, respectively; and the base portion 612 has the fulcrum point portion 615 in the position surrounded by the plurality of key tops 611, the fulcrum point portion 615 protruding in the direction of becoming close to the circuit board 7 and being brought into contact with the circuit board 7, thereby becoming the fulcrum point for inclination of the key main body 61 in the phase of depressing of the desired key top(s) 611; in which the urging member(s) 8 for urging the key main body 61 to the side of the circuit board 7 is provided between the chassis 2 and the key main body 61.

6. Changes of Embodiments

The present invention is by no means limited to the embodiments described above, and thus changes, improvements and the like coming within the scope in which the desire of the present invention can be attained are all contained in the present invention.

Although in the first to forth embodiments, the mobile terminals 1, and 1A to 1E each constructed as the game console are given as the manipulating apparatuses including the chassis 2, and the directional manipulating portions 5, 5A to 5C, and 5E, the present invention is by no means limited thereto. That is to say, the manipulating apparatus of the present invention can also be constructed in the form of any other suitable mobile terminal such as a Personal Digital Assistant (PDA) or a notebook-sized Personal Computer (PC). In addition, the present invention can also be applied to a controller which is connected to an electronic apparatus such as a computer either in a wireless manner or in a wired manner, and is adapted to output a manipulation signal.

The cross key 6 in which the key main body 61 having the four key tops 611 integrated with one another in the base portion 612, and the four elastic portions 62 are molded integrally with each other is given in the first embodiment described above. Also, the cross key 9A in which the four elastic portions 92 are mounted to the base portion 312 is given in each of the second to fourth embodiments. However, the present invention is by no means limited thereto. For example, there may also be adopted instead a cross key in which members corresponding to the four elastic portions 62, respectively, for example, are stuck to the key main body 61, so that the members and the key main body 61 are provided integrally with each other. In addition, there may also be adopted instead a cross key in which the base portion 912 and the four elastic portions 92 are molded integrally with each other. Moreover, there may also be adopted instead a cross key including none of the elastic portions 62 and 92.

Although in each of the first to fourth embodiments, the number of key tops 611, 911 is set as four, the present invention is by no means limited thereto, and thus all it takes is that the number of key tops is two or more. In such a case, the opening portions which are formed in the chassis, and through which the key tops are exposed to the outside of the chassis may be formed so as to correspond to the positions and number of key tops, or one opening portion through which the four key tops are all exposed to the outside of the chassis may also be adopted as with the mobile terminal 1D of the another change of the third embodiment.

Although in each of the first to fourth embodiments, the four elastic portions 62, 92 include the four protrusion portions 621, 921 which protrude toward the circuit board 7, and desired one of which is adapted to press the corresponding one of the switches 71 disposed on the circuit board 7, the present invention is by no means limited thereto. That is to say, the four protrusion portions 621, 921 may not be provided. In addition, the shape of each of the four protrusion portions 621, 921 is by no means limited to the approximately cylindrical shape. That is to say, all it takes is that each of the four protrusion portions 621, 921 has a shape adapted to press the dome portion 75 of the switch 71 at a point.

Although in each of the first to fourth embodiments, the fulcrum point portion 615, 915 is formed approximately at the center of the base portion 612, 912, the present invention is by no means limited thereto. Thus, the fulcrum point portion 615, 915 may be formed in a position deviated from the center of the base portion 612, 912. For example, in the case where a pair of key tops (a pair of key tops with which the up and down input manipulation or the right and left input manipulation is carried out) is disposed so as to correspond to a pair of vertices, of an approximately rectangular base portion, located across the center from each other, a plurality of fulcrum point portions may be located on a straight line making at a right angle with a straight line connecting the pair of vertices.

Although in each of the first to fourth embodiments, the thick portion 614, 914 is formed in the circumference of the fulcrum point portion 615, 915, the present invention is by no means limited, thereto. That is to say, the thick portion 614, 914 may not be provided as long as the sufficient strength of the cross key 6, 9 (especially, the base portion 612, 912) can be ensured. In addition, the shape of the thick portion 614, 914 is by no means limited to the approximately circular shape when being planarly viewed, and thus may also have any other suitable shape such as a rectangular shape when being planarly viewed. Moreover, the eight bridge portions 9151 may not be provided for the fulcrum point portion 915.

Although in each of the first to fourth embodiments, the position of each of the tip portions, of the four protrusion portions 621, 921, desired one of which is adapted to press the corresponding one of the switches 71 is located closer to the side of the key tops 611, 911 than to the portion, of the thick portion 614, 914, facing the circuit board 7, the present invention is by no means limited thereto. That is to say, the position of each of the tip portions of the four protrusion portions 621, 921 may also be suitably set in consideration of a stroke amount of cross key 6, 9A to 9C, the manipulability thereof and the like.

In each of the first and second embodiments, the four urging members 8 are provided between the inner surface of the front case 21, and the position corresponding to the fulcrum point portion 615 of the key main body 61. In addition, in the third embodiment, the four urging members 8E are provided between the inner surface of the front case 21, 21C, and the flange portion 9123. Moreover, in the fourth embodiment, the urging member 8E is provided between the cross key 9A and the circuit board 7. However, the present invention is by no means limited thereto. That is to say, the four urging members 8 may not be provided as long as the cross key 6, 9A to 9C can be returned from the inclination state back to the non-depressing state. In addition, the position(s) of the urging member(s) may not be located between the front case and the center of the cross key. For example, the position(s) of the urging member(s) may also be located between the front case and the periphery of the cross key, or may also be located between the cross key and the circuit board as with the urging member(s) 8B, 8E.

In each of the first to fourth embodiments, the key main body 61, 91 has the recess portion 613, 913 in the position corresponding to the fulcrum point portion 615, 915 on the surface side facing the front case 21, and the front case 21 has the main body supporting portion 213, 213E which is engaged with the inner surface of the recess portion 613, 913, thereby supporting the cross key 6, 9A, 9B. However, the present invention is by no means limited thereto. For example, the main body supporting portion and the recess portion may not be provided as with the mobile terminal 1C. In this case, when there is adopted a construction that the urging member(s) disposed between the front case and the cross key is (are) bonded to each of the front case and the cross key, the shifting of the plan position of the cross key is suppressed.

Although in each of the first and second embodiments, each of the four urging members 8 is formed into the annular shape so as to surround the main key supporting portion 213, the present invention is by no means limited thereto, and thus each of the urging members may be formed into any other suitable shape. For example, there may also be adopted instead a construction that a plurality of urging members are disposed in the circumference of the main body supporting portion 213. In this case, the urging members may be disposed in the circumference of the main body supporting portion 213 so as to correspond to the positions of the key tops 611, 911 (for example, the positions close to the key tops 611, 911) and the number of key tops 611, 911, respectively. For example, in the case of the cross key 6, 9A described above, there may also be adopted instead a construction that either four or eight urging members are disposed.

In addition, when no main body supporting portion 213 is provided, there may also be adopted instead a construction that the urging members are provided in the inner surface of the front case 21 surrounded by the four opening portions 212A so as to urge the center of the cross key 6 surrounded by the four key tops 611 to the side of the circuit board 7. Moreover, there may also be adopted instead a construction that the protrusion portions which protrude in the direction of coming close to the inner surface of the front case 21 are provided on the cross key 6 side, the recess portions which are engaged with the protrusion portions, respectively, are provided on the front case 21 side, and the urging members are provided in the circumference of the protrusion portions so as to be interposed between the cross key 6 and the inner surface of the front case 21.

In addition, the position and the shape of each of the four urging members 8B, as described above, can also be suitably set. In addition thereto, the urging members 8, 8B and 8E may also be combined with one another in order to be provided in the mobile terminal 1, 1A to 1E.

Likewise, although the urging member 8E is formed into the annular shape so as to surround the fulcrum point portion 915, the present invention is by no means limited thereto, and thus the shapes, the number and the disposition positions of the urging members may also be suitably set. For example, there may also be adopted instead a construction that the urging members are provided in the positions corresponding to the bridge portions 9142, 9151, respectively.

Although in each of the first to fourth embodiments, the rigidities of the elastic portions 62, 92 (especially, the protrusion portions 621, 921), the urging member(s) 8, 8B, 8E, and the switches 71 (especially, the dome portions 75) are set in such a way that the rigidity of each of the elastic portions 62, 92 becomes highest, and the rigidity of the urging member(s) 8, 8B, 8E becomes lowest, the present invention is by no means limited thereto. That is to say, those rigidities of the elastic portion 62, 92, the urging member 8, 8B, 8E, and the switch 71 can be suitably set in consideration of the manipulability of the directional manipulating portion 5, 5A to 5C, 5E.

Although in the first embodiment, each of the four elastic portions 62 is formed in accordance with the shape and the size of each of the four key tops 611, and in each of the second to fourth embodiments, each of the elastic portions 92 is formed into the approximately circular shape, the present invention is by no means limited thereto. That is to say, all it takes is that the elastic portions are formed so as to correspond to the positions of the four key tops 611, 911, respectively, and are interposed between the four key tops 611, 911, and the four switches 71 disposed so as to correspond to the four key tops 611, 911, respectively. For example, there may also be adopted a construction that the elastic members each made of the same material as that of each of the four protrusions 621, 921 and each having the same shape as that of each of the four protrusions 621, 921 are mounted to the positions corresponding to the four switches 71 of the key main body 61, respectively, instead of providing the four elastic portions 62, 92.

Although in the first embodiment, the key main body 61 is made of the transparent resin such as the acrylic resin, the present invention is by no means limited thereto. For example, the key main body 61 may also be made of any other suitable material such as a colored resin as with the key main body 91. In this case, all it takes is that the printing is carried out for each of the upper surfaces of the four key tops 611 (the surface facing the finger of the user), each of the upper surfaces of the four key tops 611 is processed (engraved), or one of different two resins of each of the four key tops which are formed through the two-color molding using the different two resins is exposed, thereby forming pictures or the like on the upper surfaces of the four key tops. That is to say, the color and the material of the cross key can be suitably set. For example, when triangular symbols indicating the respective directions are formed on the respective key tops, the cross key are formed through the two-color molding in such a way that approximately triangular columnar resins (such as high slide ABS) are embedded in the respective key tops, thereby making it possible to visualize the symbols from above. In addition, by forming the cross keys in such a manner, the symbols can be prevented from disappearing due to the input manipulation, the secular change and the like.

In each of the first to fourth embodiments described above, the switch 71 serving as the detecting portion includes the dome portion 75 in the inner surface of which the third contact portion 74 is formed, and which is displaced in accordance with the pressing by the protrusion portion 621, 921, thereby electrically connecting the first contact portion 72 and the second contact portion 73 with each other. However, the present invention is by no means limited thereto. That is to say, the dome portion 75 may not be provided, and the material for the dome portion 75 is not limited to the metal, and a dome portion made of a resin and obtained through the embossing may also be adopted instead. In addition, although both the first contact portion 72 and the second contact portion 73 are formed on the circuit board 7, there may also be adopted instead a switch including the first contact portion and the second contact portion which are disposed at a predetermined distance so as to face each other. That is to say, with regard to the construction of the detecting portion, any other suitable construction such as a touch switch may also be adopted instead.

It should be understood by those skilled in the art that various modifications, combinations, sub-combinations and alternations may occur depending on design requirements and other factors insofar as they are within the scope of the appended claims or the equivalent thereof.

What is claimed is:

1. A manipulating apparatus including a chassis provided with a manipulating portion with which an input manipulation is carried out, said manipulating portion comprising:
   a key top exposed to an outside of said chassis through an opening portion, which said chassis has, and a key main body having a base portion on which said key top is formed within said chassis;
   a circuit board in which a detecting portion is disposed in a position corresponding to said key top; and
   a flat plate-shaped elastic body interposed between said key main body and said detecting portion, wherein
   said elastic body is provided integrally with said base portion,
   said elastic body has a protrusion portion which protrudes from a surface facing said detecting portion and which is adapted to press said detecting portion, and
   said base portion has a fulcrum point portion which protrudes from said base portion toward said circuit board to be brought into contact with said circuit board, and which becomes a fulcrum point for inclination of said key main body in a phase of depressing said key top.

2. The manipulating apparatus according to claim 1, wherein
   said key top includes a plurality of key tops, and
   said fulcrum point portion protrudes from an approximately central position of said base portion surrounded by said plurality of key tops toward said circuit board.

3. The manipulating apparatus according to claim 1, wherein said base portion has a thick portion in a circumference of said fulcrum point portion.

4. The manipulating apparatus according to claim 3, wherein
said flat plate-shaped elastic body located outside said thick portion of said base portion is located closer to a side of said key top than to a portion of said thick portion facing said circuit board; and
a portion of a tip portion of said protrusion portion in a protrusion direction is located closer to the side of said key top than to said portion of said thick portion facing said circuit board.

5. The manipulating apparatus according to claim 1, wherein an urging member which is adapted to urge said key main body to a side of said circuit board is provided between said chassis and a position of said key main body corresponding to said fulcrum point portion.

6. The manipulating apparatus according to claim 5, wherein
said key main body has a recess portion in a position, in a surface on a side opposite to a surface having said fulcrum point portion formed therein, corresponding to said fulcrum point portion; and
said chassis has a main body supporting portion which is formed in a portion corresponding to said recess portion, and which is accommodated in said recess portion to support said key main body.

7. The manipulating apparatus according to claim 6, wherein said urging member is provided in a circumference of said main body supporting portion.

8. The manipulating apparatus according to claim 5, wherein of rigidity of said flat plate-shaped elastic body, said urging member and said detecting portion, the rigidity of said flat plate-shaped elastic body is highest, and the rigidity of said urging member is lowest.

9. The manipulating apparatus according to claim 1, wherein said base portion and said elastic body is formed integrally with each other through two-color molding.

10. The manipulating apparatus according to claim 1, wherein said elastic body has a size corresponding to said key top.

11. The manipulating apparatus according to claim 1, wherein said detecting portion includes:
a first contact portion disposed on said circuit board;
a second contact portion disposed at a predetermined gap from said first contact portion; and
a dome portion which covers said second contact point, and which has flexibility with which when said dome portion is pressed by the corresponding said flat plate-shaped elastic body, said second contact point and said first contact point are made to electrically contact each other.

12. A manipulating apparatus including a chassis provided with a manipulating portion with which an input manipulation is carried out, said manipulating portion comprising:
a key top exposed to an outside of said chassis through an opening portion, which said chassis has, and a key main body having a base portion on which said key top is formed within said chassis; and
a circuit board having a detecting portion for detecting an input manipulation using the desired key top, said detecting portion being disposed in a position corresponding to said key top, wherein
said base portion has a fulcrum point portion protruding in a direction of becoming close to said circuit board and being brought into contact with said circuit board, thereby becoming a fulcrum point for inclination of said key main body in a phase of depressing of the desired key top, and
an urging member for urging said key main body to a side of said circuit board is provided between said chassis and said key main body.

13. The manipulating apparatus according to claim 12, wherein
said key main body has a recess portion in a position, in a surface on a side opposite to a surface having said fulcrum point portion formed therein, corresponding to said fulcrum point portion; and
said chassis has a main body supporting portion which is formed in a portion corresponding to said recess portion, and which is accommodated in said recess portion to support said key main body.

14. The manipulating apparatus according to claim 13, wherein a gap corresponding to a displacement amount of key main body is defined between said main body supporting portion and an inner surface of said recess portion.

15. The manipulating apparatus according to claim 12, wherein
said key main body includes a flange portion which extends to an outside of said key top, and which faces end edges of said opening portion in said chassis; and
said urging member is provided between said chassis and said flange portion.

16. The manipulating apparatus according to claim 12, wherein said base portion has a thick portion in a circumference of said fulcrum point portion.

17. The manipulating apparatus according to claim 12, wherein a flat plate-shaped elastic body is provided integrally with said key main body in a position corresponding to said key top, on a side opposite to a side, of said key main body, through which said key top is exposed to an outside of said chassis.

18. A mobile terminal comprising
a manipulating apparatus including a chassis provided with a manipulating portion with which an input manipulation is carried out, said manipulating portion including:
a key top exposed to an outside of said chassis through an opening portion, which said chassis has, and a key main body having a base portion on which said key top is formed within said chassis;
a circuit board in which a detecting portion is disposed in a position corresponding to said key top; and
a flat plate-shaped elastic body interposed between said key main body and said detecting portion, wherein
said elastic body is provided integrally with said base portion,
said elastic body has a protrusion portion which protrudes from a surface facing said detecting portion and which is adapted to press said detecting portion, and
said base portion has a fulcrum point portion which protrudes from said base portion toward said circuit board to be brought into contact with said circuit board, and which becomes a fulcrum point for inclination of said key main body in a phase of depressing said key top.

19. A mobile terminal comprising
a manipulating apparatus including a chassis provided with a manipulating portion with which an input manipulation is carried out, said manipulating portion including:
a key top exposed to an outside of said chassis through an opening portion, which said chassis has, and a key main body having a base portion on which said key top is formed within said chassis; and
a circuit board having a detecting portion for detecting an input manipulation using the desired key top, said detecting portion being disposed in a position corresponding to said key top, wherein said base portion has a fulcrum point portion protruding in a direction of becoming close to said circuit board and being brought into contact with said circuit board, thereby becoming a fulcrum point for inclination of said key main body in a phase of depressing of the desired key top, and an urging member for urging said key main body to a side of said circuit board is provided between said chassis and said key main body.

* * * * *